(12) United States Patent
Dropps et al.

(10) Patent No.: US 7,558,281 B2
(45) Date of Patent: Jul. 7, 2009

(54) METHOD AND SYSTEM FOR CONFIGURING FIBRE CHANNEL PORTS

(75) Inventors: Frank R. Dropps, Maple Grove, MN (US); Gary M. Papenfuss, St. Paul, MN (US); Ernest G. Kohlwey, Eagan, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 626 days.

(21) Appl. No.: 10/894,917

(22) Filed: Jul. 20, 2004

(65) Prior Publication Data

US 2005/0018650 A1    Jan. 27, 2005

Related U.S. Application Data

(60) Provisional application No. 60/503,812, filed on Sep. 19, 2003, provisional application No. 60/537,933, filed on Jan. 21, 2004, provisional application No. 60/488,757, filed on Jul. 21, 2003, provisional application No. 60/532,965, filed on Dec. 29, 2003, provisional application No. 60/504,038, filed on Sep. 19, 2003, provisional application No. 60/495,212, filed on Aug. 14, 2003, provisional application No. 60/495,165, filed on Aug. 14, 2003, provisional application No. 60/503,809, filed on Sep. 19, 2003, provisional application No. 60/505,381, filed on Sep. 23, 2003, provisional application No. 60/505,195, filed on Sep. 23, 2003, provisional application No. 60/557,613, filed on Mar. 30, 2004, provisional application No. 60/505,075, filed on Sep. 23, 2003, provisional application No. 60/504,950, filed on Sep. 19, 2003, provisional application No. 60/532,967, filed on Dec. 29, 2003, provisional application No. 60/532,966, filed on Dec. 29, 2003, provisional application No. 60/550,250, filed on Mar. 4, 2004, provisional application No. 60/569,436, filed on May 7, 2004, provisional application No. 60/572,197, filed on May 18, 2004, provisional application No. 60/532,963, filed on Dec. 29, 2003.

(51) Int. Cl.
H04L 12/28 (2006.01)

(52) U.S. Cl. ...................................... 370/422

(58) Field of Classification Search ................. 370/238, 370/351, 352, 357, 360–366, 389, 392, 400, 370/410, 412, 413, 419, 420, 428, 437, 461, 370/463, 537, 229–231, 251, 421, 422; 709/886, 709/238, 233, 249

See application file for complete search history.

(56) References Cited

U.S. PATENT DOCUMENTS 4,081,612 A    3/1978 Hafner
(Continued)

FOREIGN PATENT DOCUMENTS

EP    0649098    9/1994
(Continued)

OTHER PUBLICATIONS

Clark, Tom, "Zoning for Fibre Channel Fabrics", Vixel Corporation Paper—XP002185194., (Aug. 1999), pp. 1-6.
(Continued)

*Primary Examiner*—Kevin C Harper
*Assistant Examiner*—Xavier Wong
(74) *Attorney, Agent, or Firm*—Klein, O'Neill & Singh, LLP

(57) ABSTRACT

A fiber channel switch element for routing fiber channel frame is provided. The switch element includes a fiber channel port that can be configured to support plural data transfer rates. The data transfer rate may be 1 G, 2 G, 4 G, 8 G or 10 G. The switch element includes a clock configuration module for providing a clock signal that is based on the data transfer rate. A receive segment of the fiber channel port sends a signal to a transmit segment to avoid an under flow condition. The receive segment also waits for a certain frame length after a fiber channel frame is written and before the fiber channel frame is read, depending upon a data transfer rate of a source port. Multiple lanes may be configured as a single 10 G multi lane port or as multiple individual ports.

20 Claims, 17 Drawing Sheets

U.S. PATENT DOCUMENTS

| | | | |
|---|---|---|---|
| 4,162,375 A | 7/1979 | Schlichte | 179/15 |
| 4,200,929 A | 4/1980 | Davidjuk et al. | |
| 4,258,418 A | 3/1981 | Heath | |
| 4,344,132 A | 8/1982 | Dixon et al. | |
| 4,382,159 A | 5/1983 | Bowditch | |
| 4,425,640 A | 1/1984 | Philip et al. | 370/58 |
| 4,546,468 A | 10/1985 | Christmas et al. | 370/54 |
| 4,569,043 A | 2/1986 | Simmons et al. | 370/63 |
| 4,691,296 A | 9/1987 | Struger | |
| 4,716,561 A | 12/1987 | Angell et al. | |
| 4,725,835 A | 2/1988 | Schreiner et al. | 340/825.83 |
| 4,821,034 A | 4/1989 | Anderson et al. | 340/825 |
| 4,860,193 A | 8/1989 | Bentley et al. | |
| 4,964,119 A | 10/1990 | Endo et al. | |
| 4,980,857 A | 12/1990 | Walter et al. | |
| 5,025,370 A | 6/1991 | Koegel et al. | |
| 5,051,742 A | 9/1991 | Hullett et al. | |
| 5,090,011 A | 2/1992 | Fukuta et al. | |
| 5,115,430 A | 5/1992 | Hahne et al. | |
| 5,144,622 A | 9/1992 | Takiyasu et al. | 370/85.13 |
| 5,258,751 A | 11/1993 | DeLuca et al. | |
| 5,260,933 A | 11/1993 | Rouse | |
| 5,260,935 A | 11/1993 | Turner | |
| 5,280,483 A | 1/1994 | Kamoi et al. | |
| 5,291,481 A | 3/1994 | Doshi et al. | |
| 5,339,311 A | 8/1994 | Turner | |
| 5,367,520 A | 11/1994 | Cordell | 370/60 |
| 5,390,173 A | 2/1995 | Spinney et al. | |
| 5,425,022 A * | 6/1995 | Clark et al. | 370/360 |
| 5,537,400 A | 7/1996 | Diaz et al. | |
| 5,568,165 A | 10/1996 | Kimura | |
| 5,568,167 A | 10/1996 | Galbi et al. | |
| 5,579,443 A | 11/1996 | Tatematsu et al. | |
| 5,590,125 A | 12/1996 | Acampora et al. | |
| 5,594,672 A | 1/1997 | Hicks | |
| 5,598,541 A | 1/1997 | Malladi | 395/286 |
| 5,610,745 A | 3/1997 | Bennett | 359/139 |
| 5,666,483 A | 9/1997 | McClary | |
| 5,677,909 A | 10/1997 | Heide | |
| 5,687,172 A | 11/1997 | Cloonan et al. | 370/395 |
| 5,732,206 A | 3/1998 | Mendel | |
| 5,748,612 A | 5/1998 | Stoevhase et al. | 370/230 |
| 5,757,771 A | 5/1998 | Li et al. | |
| 5,764,927 A | 6/1998 | Murphy et al. | |
| 5,768,271 A | 6/1998 | Seid et al. | |
| 5,768,533 A | 6/1998 | Ran | |
| 5,784,358 A | 7/1998 | Smith et al. | |
| 5,790,545 A | 8/1998 | Holt et al. | |
| 5,790,840 A | 8/1998 | Bulka et al. | |
| 5,818,842 A | 10/1998 | Burwell et al. | 370/397 |
| 5,821,875 A | 10/1998 | Lee et al. | |
| 5,822,300 A | 10/1998 | Johnson et al. | |
| 5,825,748 A | 10/1998 | Barkey et al. | |
| 5,828,475 A | 10/1998 | Bennett et al. | |
| 5,835,748 A | 11/1998 | Orenstein et al. | |
| 5,835,752 A | 11/1998 | Chiang et al. | |
| 5,850,386 A | 12/1998 | Anderson et al. | |
| 5,892,604 A * | 4/1999 | Yamanaka et al. | 398/48 |
| 5,894,560 A | 4/1999 | Carmichael et al. | |
| 5,925,119 A * | 7/1999 | Maroney | 710/315 |
| 5,936,442 A | 8/1999 | Liu et al. | |
| 5,954,796 A | 9/1999 | McCarty et al. | |
| 5,974,547 A | 10/1999 | Klimenko | |
| 5,978,379 A | 11/1999 | Chan et al. | |
| 5,987,028 A | 11/1999 | Yang et al. | 370/380 |
| 5,999,528 A | 12/1999 | Chow et al. | 370/365 |
| 6,009,226 A | 12/1999 | Tsuji et al. | |
| 6,011,779 A | 1/2000 | Wills | |
| 6,014,383 A | 1/2000 | McCarty | 370/453 |
| 6,021,128 A | 2/2000 | Hosoya et al. | 370/380 |
| 6,031,842 A | 2/2000 | Trevitt et al. | |
| 6,046,979 A | 4/2000 | Bauman | |
| 6,047,323 A | 4/2000 | Krause | 709/227 |
| 6,061,360 A | 5/2000 | Miller et al. | |
| 6,081,512 A | 6/2000 | Muller et al. | 370/256 |
| 6,108,738 A | 8/2000 | Chambers et al. | |
| 6,108,778 A | 8/2000 | LaBerge | |
| 6,118,776 A | 9/2000 | Berman | |
| 6,118,791 A | 9/2000 | Fichou et al. | |
| 6,128,292 A | 10/2000 | Kim et al. | 370/356 |
| 6,131,123 A | 10/2000 | Hurst et al. | |
| 6,134,127 A | 10/2000 | Kirchberg | |
| 6,144,668 A | 11/2000 | Bass et al. | |
| 6,147,976 A | 11/2000 | Shand et al. | |
| 6,151,644 A | 11/2000 | Wu | |
| 6,158,014 A * | 12/2000 | Henson | 713/501 |
| 6,160,813 A | 12/2000 | Banks et al. | 370/422 |
| 6,185,203 B1 | 2/2001 | Berman | |
| 6,201,787 B1 | 3/2001 | Baldwin et al. | |
| 6,209,089 B1 | 3/2001 | Selitrennikoff et al. | |
| 6,229,822 B1 | 5/2001 | Chow et al. | |
| 6,230,276 B1 | 5/2001 | Hayden | |
| 6,240,096 B1 | 5/2001 | Book | |
| 6,252,891 B1 | 6/2001 | Perches | |
| 6,253,267 B1 | 6/2001 | Kim et al. | |
| 6,278,708 B1 | 8/2001 | Von Hammerstein et al. | |
| 6,286,011 B1 | 9/2001 | Velamuri et al. | |
| 6,289,002 B1 | 9/2001 | Henson et al. | |
| 6,301,612 B1 | 10/2001 | Selitrennikoff et al. | |
| 6,307,857 B1 | 10/2001 | Yokoyama et al. | |
| 6,308,220 B1 | 10/2001 | Mathur | 709/238 |
| 6,311,204 B1 * | 10/2001 | Mills | 718/100 |
| 6,324,181 B1 | 11/2001 | Wong et al. | 370/403 |
| 6,330,236 B1 | 12/2001 | Ofek et al. | 370/369 |
| 6,333,932 B1 | 12/2001 | Kobayasi et al. | |
| 6,335,935 B2 | 1/2002 | Kadambi et al. | |
| 6,343,324 B1 | 1/2002 | Hubis et al. | |
| 6,353,612 B1 | 3/2002 | Zhu et al. | |
| 6,370,605 B1 | 4/2002 | Chong | |
| 6,397,360 B1 | 5/2002 | Bruns | |
| 6,401,128 B1 | 6/2002 | Stai et al. | |
| 6,404,749 B1 | 6/2002 | Falk | |
| 6,411,599 B1 | 6/2002 | Blanc et al. | 370/219 |
| 6,411,627 B1 | 6/2002 | Hullett et al. | |
| 6,418,477 B1 | 7/2002 | Verma | |
| 6,421,342 B1 | 7/2002 | Schwartz et al. | |
| 6,421,711 B1 | 7/2002 | Blumenau et al. | |
| 6,424,658 B1 | 7/2002 | Mathur | 370/429 |
| 6,438,628 B1 | 8/2002 | Messerly et al. | |
| 6,449,274 B1 | 9/2002 | Holden et al. | 370/392 |
| 6,452,915 B1 | 9/2002 | Jorgensen | |
| 6,467,008 B1 | 10/2002 | Gentry, Jr. et al. | 710/261 |
| 6,470,026 B1 | 10/2002 | Pearson et al. | |
| 6,480,500 B1 | 11/2002 | Erimli et al. | |
| 6,509,988 B1 * | 1/2003 | Saito | 398/47 |
| 6,522,656 B1 | 2/2003 | Gridley | |
| 6,532,212 B1 | 3/2003 | Soloway et al. | |
| 6,553,036 B1 | 4/2003 | Miller et al. | |
| 6,563,796 B1 | 5/2003 | Saito | |
| 6,570,850 B1 | 5/2003 | Gutierrez et al. | |
| 6,570,853 B1 | 5/2003 | Johnson et al. | |
| 6,594,231 B1 | 7/2003 | Byham et al. | |
| 6,597,691 B1 | 7/2003 | Anderson et al. | 370/360 |
| 6,597,777 B1 | 7/2003 | Ho | |
| 6,606,690 B2 | 8/2003 | Padovano | |
| 6,614,796 B1 | 9/2003 | Black et al. | |
| 6,622,206 B1 | 9/2003 | Kanamaru et al. | |
| 6,629,161 B2 * | 9/2003 | Matsuki et al. | 710/22 |
| 6,643,298 B1 | 11/2003 | Brunheroto et al. | |
| 6,657,962 B1 | 12/2003 | Barri et al. | |
| 6,684,209 B1 | 1/2004 | Ito et al. | |
| 6,697,359 B1 | 2/2004 | George | 370/357 |
| 6,697,368 B2 | 2/2004 | Chang et al. | |
| 6,697,914 B1 | 2/2004 | Hospodor et al. | |

| Patent | Date | Inventor |
|---|---|---|
| 6,718,497 B1 | 4/2004 | Whitby-Strevens |
| 6,738,381 B1 | 5/2004 | Agnevik et al. |
| 6,744,772 B1 | 6/2004 | Eneboe et al. |
| 6,760,302 B1 | 7/2004 | Ellinas et al. |
| 6,765,871 B1 | 7/2004 | Knobel et al. |
| 6,779,083 B2 | 8/2004 | Ito et al. |
| 6,785,241 B1 | 8/2004 | Lu et al. |
| 6,807,181 B1 | 10/2004 | Weschler |
| 6,816,492 B1 | 11/2004 | Turner et al. |
| 6,816,750 B1 | 11/2004 | Klaas |
| 6,859,435 B1 | 2/2005 | Lee et al. |
| 6,862,293 B2 * | 3/2005 | Lay et al. ............... 370/420 |
| 6,865,155 B1 | 3/2005 | Wong et al. |
| 6,865,157 B1 | 3/2005 | Scott et al. |
| 6,888,831 B1 | 5/2005 | Hospodor et al. |
| 6,901,072 B1 | 5/2005 | Wong |
| 6,904,507 B2 | 6/2005 | Gil |
| 6,922,408 B2 | 7/2005 | Bloch et al. |
| 6,928,470 B1 | 8/2005 | Hamlin |
| 6,934,799 B2 | 8/2005 | Acharya et al. |
| 6,941,357 B2 | 9/2005 | Nguyen et al. |
| 6,941,482 B2 | 9/2005 | Strong |
| 6,947,393 B2 | 9/2005 | Hooper, III |
| 6,952,659 B2 | 10/2005 | King et al. |
| 6,968,463 B2 | 11/2005 | Pherson et al. |
| 6,975,627 B1 * | 12/2005 | Parry et al. ............... 370/389 |
| 6,983,342 B2 * | 1/2006 | Helenic et al. ............ 710/305 |
| 6,987,768 B1 | 1/2006 | Kojima et al. |
| 6,988,130 B2 | 1/2006 | Blumenau et al. |
| 6,988,149 B2 | 1/2006 | Odenwald |
| 7,000,025 B1 | 2/2006 | Wilson |
| 7,002,926 B1 | 2/2006 | Eneboe et al. |
| 7,010,607 B1 | 3/2006 | Bunton |
| 7,024,410 B2 | 4/2006 | Ito et al. |
| 7,031,615 B2 * | 4/2006 | Gentile .................... 398/155 |
| 7,039,070 B2 | 5/2006 | Kawakatsu |
| 7,039,870 B2 | 5/2006 | Takaoka et al. |
| 7,047,326 B1 | 5/2006 | Crosbie et al. |
| 7,050,392 B2 | 5/2006 | Valdevit |
| 7,051,182 B2 | 5/2006 | Blumenau et al. |
| 7,055,068 B2 | 5/2006 | Riedl |
| 7,061,862 B2 | 6/2006 | Horiguchi et al. |
| 7,061,871 B2 | 6/2006 | Sheldon et al. |
| 7,076,569 B1 | 7/2006 | Bailey et al. |
| 7,082,126 B2 | 7/2006 | Ain et al. |
| 7,092,374 B1 | 8/2006 | Gubbi |
| 7,110,394 B1 | 9/2006 | Chamdani et al. |
| 7,120,728 B2 | 10/2006 | Krakirian et al. |
| 7,123,306 B1 | 10/2006 | Goto et al. |
| 7,124,169 B2 | 10/2006 | Shimozono et al. |
| 7,150,021 B1 | 12/2006 | Vajjhala et al. |
| 7,151,778 B2 | 12/2006 | Zhu et al. |
| 7,171,050 B2 | 1/2007 | Kim |
| 7,185,062 B2 | 2/2007 | Lolayekar et al. |
| 7,187,688 B2 | 3/2007 | Garmire et al. |
| 7,188,364 B2 | 3/2007 | Volpano |
| 7,190,667 B2 | 3/2007 | Susnow et al. |
| 7,194,538 B1 | 3/2007 | Rabe et al. |
| 7,200,108 B2 | 4/2007 | Beer et al. |
| 7,200,610 B1 | 4/2007 | Prawdiuk et al. |
| 7,209,478 B2 | 4/2007 | Rojas et al. |
| 7,215,680 B2 | 5/2007 | Mullendore et al. |
| 7,221,650 B1 | 5/2007 | Cooper et al. |
| 7,230,929 B2 | 6/2007 | Betker et al. |
| 7,233,570 B2 | 6/2007 | Gregg |
| 7,233,985 B2 | 6/2007 | Hahn et al. |
| 7,245,613 B1 | 7/2007 | Winkles et al. |
| 7,245,627 B2 | 7/2007 | Goldenberg et al. |
| 7,248,580 B2 | 7/2007 | George et al. |
| 7,263,593 B2 | 8/2007 | Honda et al. |
| 7,266,286 B2 | 9/2007 | Tanizawa et al. |
| 7,269,131 B2 | 9/2007 | Cashman et al. |
| 7,269,168 B2 | 9/2007 | Roy et al. |
| 7,277,431 B2 | 10/2007 | Walter et al. |
| 7,287,063 B2 | 10/2007 | Baldwin et al. |
| 7,292,593 B1 | 11/2007 | Winkles et al. |
| 7,315,511 B2 | 1/2008 | Morita et al. |
| 7,327,680 B1 | 2/2008 | Kloth |
| 7,346,707 B1 | 3/2008 | Erimli |
| 7,352,740 B2 | 4/2008 | Hammons et al. |
| 7,397,788 B2 | 7/2008 | Mies et al. |
| 7,406,034 B1 | 7/2008 | Cometto et al. |
| 7,443,794 B2 | 10/2008 | George et al. |
| 7,460,534 B1 | 12/2008 | Ballenger |
| 7,466,700 B2 | 12/2008 | Dropps et al. |
| 7,471,691 B2 | 12/2008 | Black et al. |
| 2001/0011357 A1 | 8/2001 | Mori |
| 2001/0022823 A1 | 9/2001 | Renaud |
| 2001/0033552 A1 | 10/2001 | Barrack et al. |
| 2001/0038628 A1 | 11/2001 | Ofek et al. ............... 370/392 |
| 2001/0043564 A1 | 11/2001 | Bloch et al. |
| 2001/0047460 A1 | 11/2001 | Kobayashi et al. |
| 2002/0016838 A1 | 2/2002 | Geluc et al. |
| 2002/0034178 A1 | 3/2002 | Schmidt et al. |
| 2002/0071387 A1 | 6/2002 | Horiguchi et al. |
| 2002/0103913 A1 | 8/2002 | Tawil et al. |
| 2002/0104039 A1 | 8/2002 | DeRolf et al. |
| 2002/0118692 A1 | 8/2002 | Oberman et al. |
| 2002/0122428 A1 | 9/2002 | Fan et al. |
| 2002/0124124 A1 | 9/2002 | Matsumoto et al. |
| 2002/0147560 A1 | 10/2002 | Devins et al. |
| 2002/0147843 A1 | 10/2002 | Rao |
| 2002/0156918 A1 | 10/2002 | Valdevit et al. |
| 2002/0159385 A1 | 10/2002 | Susnow et al. |
| 2002/0172195 A1 | 11/2002 | Pekkala et al. |
| 2002/0174197 A1 | 11/2002 | Schimke et al. |
| 2002/0191602 A1 | 12/2002 | Woodring et al. |
| 2002/0194294 A1 | 12/2002 | Blumenau et al. |
| 2002/0196773 A1 | 12/2002 | Berman |
| 2003/0002503 A1 * | 1/2003 | Brewer et al. ............ 370/392 |
| 2003/0002516 A1 * | 1/2003 | Boock et al. ............. 370/412 |
| 2003/0016683 A1 | 1/2003 | George et al. |
| 2003/0021239 A1 | 1/2003 | Mullendore et al. |
| 2003/0026267 A1 | 2/2003 | Oberman et al. |
| 2003/0026287 A1 | 2/2003 | Mullendore et al. |
| 2003/0033487 A1 | 2/2003 | Pfister et al. |
| 2003/0035433 A1 | 2/2003 | Craddock et al. |
| 2003/0046396 A1 | 3/2003 | Richter et al. |
| 2003/0056000 A1 | 3/2003 | Mullendore et al. |
| 2003/0063567 A1 * | 4/2003 | Dehart .................... 370/252 |
| 2003/0072316 A1 | 4/2003 | Niu et al. |
| 2003/0076788 A1 | 4/2003 | Grabauskas et al. |
| 2003/0079019 A1 * | 4/2003 | Lolayekar et al. ......... 709/226 |
| 2003/0084219 A1 | 5/2003 | Yao et al. |
| 2003/0086377 A1 | 5/2003 | Berman |
| 2003/0091062 A1 * | 5/2003 | Lay et al. ............... 370/463 |
| 2003/0093607 A1 | 5/2003 | Main et al. |
| 2003/0103451 A1 | 6/2003 | Lutgen et al. |
| 2003/0112819 A1 * | 6/2003 | Kofoed et al. ............ 370/431 |
| 2003/0115355 A1 | 6/2003 | Cometto et al. |
| 2003/0117961 A1 | 6/2003 | Chuah et al. |
| 2003/0118053 A1 | 6/2003 | Edsall et al. |
| 2003/0120743 A1 | 6/2003 | Coatney et al. |
| 2003/0120791 A1 * | 6/2003 | Weber et al. ............ 709/231 |
| 2003/0120983 A1 | 6/2003 | Vieregge et al. |
| 2003/0126223 A1 | 7/2003 | Jenne et al. |
| 2003/0126242 A1 | 7/2003 | Chang |
| 2003/0131105 A1 | 7/2003 | Czeiger et al. |
| 2003/0137941 A1 | 7/2003 | Kaushik et al. |
| 2003/0139900 A1 | 7/2003 | Robison |
| 2003/0172149 A1 | 9/2003 | Edsall et al. |
| 2003/0172239 A1 | 9/2003 | Swank |
| 2003/0174652 A1 | 9/2003 | Ebata |
| 2003/0174721 A1 | 9/2003 | Black et al. |
| 2003/0174789 A1 | 9/2003 | Waschura et al. |
| 2003/0179709 A1 | 9/2003 | Huff |

| | | | | | |
|---|---|---|---|---|---|
| 2003/0179748 A1 | 9/2003 | George et al. ............... 370/389 | WO | WO-98/36537 | 8/1998 |
| 2003/0179755 A1 | 9/2003 | Fraser | WO | WO-01/95566 | 12/2001 |
| 2003/0189930 A1* | 10/2003 | Terrell et al. ................ 370/389 | WO | WO03/088050 | 10/2003 |
| 2003/0189935 A1 | 10/2003 | Warden et al. | | | |
| 2003/0191857 A1 | 10/2003 | Terrell et al. | | | |
| 2003/0195983 A1 | 10/2003 | Krause | | | |
| 2003/0198238 A1 | 10/2003 | Westby | | | |
| 2003/0200315 A1 | 10/2003 | Goldenberg et al. | | | |
| 2003/0218986 A1 | 11/2003 | DeSanti et al. | | | |
| 2003/0229808 A1 | 12/2003 | Heintz et al. | | | |
| 2003/0236953 A1 | 12/2003 | Grieff et al. | | | |
| 2004/0013088 A1 | 1/2004 | Gregg | | | |
| 2004/0013092 A1 | 1/2004 | Betker et al. | | | |
| 2004/0013113 A1 | 1/2004 | Singh et al. | | | |
| 2004/0013125 A1 | 1/2004 | Betker et al. | | | |
| 2004/0015638 A1 | 1/2004 | Forbes | | | |
| 2004/0024831 A1 | 2/2004 | Yang et al. | | | |
| 2004/0028038 A1 | 2/2004 | Anderson et al. | | | |
| 2004/0054776 A1 | 3/2004 | Klotz et al. | | | |
| 2004/0054866 A1 | 3/2004 | Blumenau et al. | | | |
| 2004/0057389 A1 | 3/2004 | Klotz et al. | | | |
| 2004/0064664 A1 | 4/2004 | Gil | | | |
| 2004/0081186 A1 | 4/2004 | Warren et al. | | | |
| 2004/0081196 A1 | 4/2004 | Elliott | | | |
| 2004/0081394 A1 | 4/2004 | Biran et al. | | | |
| 2004/0085955 A1 | 5/2004 | Walter et al. | | | |
| 2004/0085974 A1* | 5/2004 | Mies et al. ................... 370/406 | | | |
| 2004/0085994 A1 | 5/2004 | Warren et al. | | | |
| 2004/0092278 A1 | 5/2004 | Diepstraten et al. | | | |
| 2004/0100944 A1* | 5/2004 | Richmond et al. .......... 370/360 | | | |
| 2004/0109418 A1 | 6/2004 | Fedorkow et al. | | | |
| 2004/0123181 A1 | 6/2004 | Moon et al. | | | |
| 2004/0125799 A1 | 7/2004 | Buer | | | |
| 2004/0141518 A1* | 7/2004 | Milligan et al. ............. 370/463 | | | |
| 2004/0141521 A1 | 7/2004 | George ....................... 370/463 | | | |
| 2004/0151188 A1 | 8/2004 | Maveli et al. | | | |
| 2004/0153526 A1 | 8/2004 | Haun et al. | | | |
| 2004/0153566 A1 | 8/2004 | Lalsangi et al. | | | |
| 2004/0153914 A1 | 8/2004 | El-Batal | | | |
| 2004/0174813 A1 | 9/2004 | Kasper et al. | | | |
| 2004/0202189 A1 | 10/2004 | Arndt et al. | | | |
| 2004/0208201 A1 | 10/2004 | Otake | | | |
| 2004/0218531 A1 | 11/2004 | Cherian et al. | | | |
| 2004/0267982 A1 | 12/2004 | Jackson et al. | | | |
| 2005/0018673 A1 | 1/2005 | Dropps et al. | | | |
| 2005/0023656 A1 | 2/2005 | Leedy | | | |
| 2005/0036485 A1 | 2/2005 | Eilers et al. | | | |
| 2005/0036499 A1 | 2/2005 | Dutt et al. | | | |
| 2005/0036763 A1 | 2/2005 | Kato et al. | | | |
| 2005/0047334 A1 | 3/2005 | Paul et al. | | | |
| 2005/0073956 A1 | 4/2005 | Moores et al. | | | |
| 2005/0076113 A1 | 4/2005 | Klotz et al. | | | |
| 2005/0088969 A1 | 4/2005 | Carlsen et al. | | | |
| 2005/0108444 A1 | 5/2005 | Flauaus et al. | | | |
| 2005/0111845 A1* | 5/2005 | Nelson et al. ............... 398/138 | | | |
| 2005/0117522 A1 | 6/2005 | Basavaiah et al. | | | |
| 2005/0177641 A1 | 8/2005 | Yamagami | | | |
| 2005/0198523 A1 | 9/2005 | Shanbhag et al. | | | |
| 2006/0013248 A1 | 1/2006 | Mujeeb et al. | | | |
| 2006/0034192 A1 | 2/2006 | Hurley et al. | | | |
| 2006/0034302 A1 | 2/2006 | Peterson | | | |
| 2006/0047852 A1 | 3/2006 | Shah et al. | | | |
| 2006/0074927 A1 | 4/2006 | Sullivan et al. | | | |
| 2006/0107260 A1 | 5/2006 | Motta | | | |
| 2006/0143300 A1 | 6/2006 | See et al. | | | |
| 2006/0184711 A1 | 8/2006 | Pettey et al. | | | |
| 2006/0203725 A1 | 9/2006 | Paul et al. | | | |
| 2006/0274744 A1 | 12/2006 | Nagai et al. | | | |
| 2007/0206502 A1 | 9/2007 | Martin et al. | | | |

FOREIGN PATENT DOCUMENTS

| | | |
|---|---|---|
| EP | 0856969 | 1/1998 |

OTHER PUBLICATIONS

Malavalli, Kumar, et al., "Distributed Computing with fibre channel fabric", Proc of the Computer Soc. Int'l Conf., Los Alamitos, IEEE Comp Soc. Press., vol. Conf. 37, XP000340745, (Feb. 24, 1992), pp. 269-274.

Martin, Charles R., "Fabric Interconnection of fibre channel standard nodes", Proceedings of the SPIE, (Sep. 8, 1992), pp. 65-71.

Yoshida, Hu, "LUN Security Considerations for Storage Area Networks," Hitachi Data Systems Paper—XP 002185193 (1999), pp. 1-7.

Claudio DeSanti, "Virtual Fabrics Switch Support"; VF Switch Support, T11/04-395v2. Sep. 2004, pp. 1-15.

Pelissier et al, "Inter-Fabric Routing", dated Jul. 30, 2004, Inter Fabric Routing (04-520v0); pp. 1-31.

DeSanti et al, "Virtual Fabrics"; Virtual Fabrics, T11/03-352v0, May 2003; pp. 1-4.

Martin et al , "Virtual Channel Architecture", Presentation by Brocade to T11/03-369V0 dated Jun. 2, 2003.

Curtis, A. R., "Design Considerations for 10-Gbit Fibre Channel", *Curtis A. Ridgeway, Distinguished I/O Architect, Storage and Computing ASIC's Division, LSI Corp.*

Malavalli, Kumar , "High Speed Fibre Channel Switching Fabric Devices", *Proceedings of the SPIE, SPIE*, Bellingham, VA, USA vol. 1577,, XP000562869, ISSN: 0277-786X,(Sep. 4, 1991),216-226.

Melhem, et al., "Minimizing Wavelength Conversions in WDM Path Establishment", *Computer Science Department, University of Pittsburgh*, Pittsburgh, PA 15260, (2001),197-211.

Ridgeway, Curt , "0GFC-40GFC using 4-lane XAUI's", *LSI Logic Presentation*—T11/03-069v0.

Brown, Douglas W., "A State-Machine Synthesizer", *18th Design Automation Conference*, (1981),301-305.

Banks, David C., et al., "Link Trunking and Measuring Link Latency in Fibre Channel Fabric", U.S. Appl. No. 60/286,046, 1-52.

International Preliminary Report on Patentability dated Apr. 3, 2007, for International patent application No. PCT/US2005/034844.

International Preliminary Report on Patentability dated Apr. 3, 2007, for International patent application No. PCT/US2005/034758.

International Preliminary Report on Patentability dated Apr. 11, 2007, for International patent application No. PCT/US2005/034845.

International Preliminary Report on Patentability dated Apr. 3, 2007, for International patent application No. PCT/US2005/035064.

International Preliminary Report on Patentability dated Jul. 24, 2007, for International patent application No. PCT/US2005/42528.

"Office Action from USPTO dated Mar. 5, 2008 for U.S. Appl. No. 10/889,259".

"Office Action from USPTO dated Mar. 7, 2008 for U.S. Appl. No. 10/894,629".

"Office Action from USPTO dated Apr. 4, 2008 for U.S. Appl. No. 10/957,465".

"Notice of Allowance from USPTO dated Apr. 10, 2008 for U.S. Appl. No. 10/241,153".

"Office Action from USPTO dated Apr. 11, 2008 for U.S. Appl. No. 10/894,595".

"Office Action from USPTO dated Apr. 14, 2008 for U.S. Appl. No. 10/894,627".

"Office Action from USPTO dated Apr. 17, 2008 for U.S. Appl. No. 10/894,689".

"Notice of Allowance from USPTO dated Apr. 18, 2008 for U.S. Appl. No. 10/894,597".

"Final Office Action from USPTO dated Apr. 23, 2008 for U.S. Appl. No. 10/889,255".

"Final Office Action from USPTO dated Apr. 25, 2008 for U.S. Appl. No. 10/894,579".

"Final Office Action from USPTO dated Apr. 1, 2008 for U.S. Appl. No. 10/956,717".

"Final Office Action from USPTO dated Apr. 3, 2008 for U.S. Appl. No. 10/894,587".

"Notice of Allowance from USPTO dated Apr. 4, 2008 for U.S. Appl. No. 11/608,634".
Naik, D. "Inside Windows Storage:Server Storage Technologies for Windows 2000, Windows Server 2003 and Beyond", *Addison-Wesley*, US, Chapter 5, XP-002381152, (Jul. 15, 2003),137-173.
"Deliver Server-Free Backup", *Pathlight & Computer Associates*, White Paper of Apr. 2000, Ithaca, New York, XP-002381153,1-8.
"Office Action from USPTO dated Jun. 27, 2008 for U.S. Appl. No. 10/894,726".
"Final Office Action from USPTO dated Jun. 4, 2008 for U.S. Appl. No. 10/894,978".
"Final Office Action from USPTO dated Jun. 5, 2008 for U.S. Appl. No. 10/889,267".
"Final Office Action from USPTO dated Jun. 10, 2008 for U.S. Appl. No. 10/894,586".
"Office Action from USPTO dated Jun. 25, 2008 for U.S. Appl. No. 10/895,175".
"Notice of Allowance from USPTO dated Jun. 25, 2008 for U.S. Appl. No. 10/894,491".
"Notice of Allowance from USPTO dated Jun. 27, 2008 for U.S. Appl. No. 10/956,717".
"Office Action from USPTO dated Jun. 26, 2008 for U.S. Appl. No. 10/894,547".
"Final Office Action from USPTO dated Apr. 29, 2008 for U.S. Appl. No. 10/894,491".
"Final Office Action from USPTO dated May 21, 2008 for U.S. Appl. No. 10/889,635".
"Office Action from USPTO dated May 2, 2008 for U.S. Appl. No. 11/037,922".
"Final Office Action from USPTO dated May 12, 2008 for U.S. Appl. No. 10/894,492".
"Office Action from USPTO dated May 14, 2008 for U.S. Appl. No. 10/956,502".
"Office Action from USPTO dated May 15, 2008 for U.S. Appl. No. 10/798,527".
"Office Action from USPTO dated Mar. 20, 2008 for U.S. Appl. No. 10/894,732".
Malavalli, et al., "Fibre Channel Framing and Signaling (FC-FS) REV 1.10", *NCITS working draft proposed American National Standard for Information Technology*, (Jan. 25, 2001).
"Examination Report from the European Patent Office dated Oct. 12, 2007 for European Application No. 05 805 632.6".
"Office Action from USPTO dated Jun. 28, 2007 for U.S. Appl. No. 10/894,529".
"Office Action from USPTO dated Sep. 14, 2007 for U.S. Appl. No. 10/894,978".
"Office Action from USPTO dated Apr. 6, 2007 for U.S. Appl. No. 10/956,718".
"Office Action from USPTO dated Oct. 3, 2007 for U.S. Appl. No. 10/956,717".
"Office Action from USPTO dated Jun. 1, 2007 for U.S. Appl. No. 10/961,463".
"Office Action from USPTO dated Jan. 19, 2006 for U.S. Appl. No. 10/212,425".
"Office Action from USPTO dated Dec. 28, 2006 for U.S. Appl. No. 10/212,425".
"Office Action from USPTO dated Sep. 6, 2007 for U.S. Appl. No. 10/889,337".
"Office Action from USPTO dated Dec. 7, 2007 for U.S. Appl. No. 10/961,463".
"Notice of Allowance from USPTO dated Dec. 21, 2007 for U.S. Appl. No. 10/961,463".
"Notice of Allowance from USPTO dated Dec. 20, 2007 for U.S. Appl. No. 10/889,337".
"Notice of Allowance from USPTO dated Jan. 8, 2008 for U.S. Appl. No. 10/889,551".
"Office Action from USPTO dated Jan. 9, 2008 for U.S. Appl. No. 10/798,468".
"Office Action from USPTO dated Jan. 9, 2008 for U.S. Appl. No. 11/608,634".
"Notice of Allowance from USPTO dated Jan. 11, 2008 for U.S. Appl. No. 10/664,548".
"Notice of Allowance from USPTO dated Jan. 10, 2008 for U.S. Appl. No. 10/263,858".
"Notice of Allowance from USPTO dated Feb. 8, 2008 for U.S. Appl. No. 10/894,529".
"Office Action from USPTO dated Feb. 12, 2008 for U.S. Appl. No. 11/057,912".
"Office Action from USPTO dated May 21, 2007 for U.S. Appl. No. 10/212,425".
"Office Action from USPTO dated Oct. 18, 2006 for U.S. Appl. No. 10/241,153".
"Office Action from USPTO dated Apr. 3, 2007 for U.S. Appl. No. 10/241,153".
"Office Action from USPTO dated Nov. 16, 2007 for U.S. Appl. No. 10/241,153".
"Office Action from USPTO dated Nov. 15, 2006 for U.S. Appl. No. 10/263,858".
"Office Action from USPTO dated Jul. 11, 2007 for U.S. Appl. No. 10/263,858".
"Office Action from USPTO dated Jan. 19, 2007 for U.S. Appl. No. 10/302,149".
"Office Action from USPTO dated Aug. 20, 2007 for U.S. Appl. No. 10/302,149".
"Office Action from USPTO dated Jul. 3, 2007 2007 for U.S. Appl. No. 10/664,548".
"Office Action from USPTO dated Sep. 20, 2007 for U.S. Appl. No. 10/798,527".
"Office Action from USPTO dated Sep. 20, 2007 for U.S. Appl. No. 10/889,267".
"Office Action from USPTO dated Aug. 31, 2007 for U.S. Appl. No. 10/889,635".
"Office Action from USPTO dated Mar. 21, 2006 for U.S. Appl. No. 10/889,588".
"Office Action from USPTO dated Sep. 10, 2007 for U.S. Appl. No. 10/889,255".
"Office Action from USPTO dated Sep. 4, 2007 for U.S. Appl. No. 10/889,551".
"Office Action from USPTO dated Sep. 20, 2007 for U.S. Appl. No. 10/889,259".
"Office Action from USPTO dated Sep. 19, 2007 for U.S. Appl. No. 10/894,492".
"Office Action from USPTO dated Oct. 4, 2007 for U.S. Appl. No. 10/894,627".
"Office Action from USPTO dated Oct. 25, 2007 for U.S. Appl. No. 10/894,491".
"Office Action from USPTO dated Oct. 23, 2007 for U.S. Appl. No. 10/894,597".
"Office Action from USPTO dated Oct. 25, 2007 for U.S. Appl. No. 10/894,579".
"Office Action from USPTO dated Oct. 11, 2007 for U.S. Appl. No. 10/894,629".
"Office Action from USPTO dated Oct. 25, 2007 for U.S. Appl. No. 10/894,536".
"Office Action from USPTO dated Nov. 13, 2007 for U.S. Appl. No. 10/894,586".
"Notice of Allowance from USPTO dated Jul. 9, 2008 for U.S. Appl. No. 10/894,629".
"Notice of Allowance from USPTO dated Jul. 9, 2008 for U.S. Appl. No. 10/894,579".
"Office Action from USPTO dated Sep. 23, 2008 for U.S. Appl. No. 12/031,585".
"Notice of Allowance from USPTO dated Jul. 17, 2008 for U.S. Appl. No. 10/894,536".
"Office Action from USPTO dated Jul. 25, 2008 for U.S. Appl. No. 10/894,827".
"Office Action from State Intellectual Property Office (SIPO) of China for Chinese application 200580032889.0".
"Final Office Action from USPTO dated Aug. 4, 2008 for U.S. Appl. No. 10/894,732".
"Notice of Allowance from USPTO dated Aug. 18, 2008 for U.S. Appl. No. 10/889,259".
"Final Office Action from USPTO dated Aug. 20, 2008 for U.S. Appl. No. 10/798,468".

"Office Action from USPTO dated Sep. 18, 2008 for U.S. Appl. No. 10/894,978".
"Notice of Allowance from the USPTO dated Sep. 29, 2008 for U.S. Appl. No. 10/889,267".
"Final Office Action from USPTO dated Oct. 8, 2008 for U.S. Appl. No. 11/057,912".
"Non-Final Office Action from USPTO dated Oct. 10, 2008 for U.S. Appl. No. 10/894,627".
"Notice of Allowance from USPTO dated Oct. 8, 2008 for U.S. Appl. No. 10/889,255".
"Notice of Allowance from USPTO dated Oct. 8, 2008 for U.S. Appl. No. 10/798,527".
"Notice of Allowance from USPTO dated Oct. 15, 2008 for U.S. Appl. No. 10/894,492".
"Final Office Action from USPTO dated Oct. 17, 2008 for U.S. Appl. No. 10/894,595".
"Final Office Action from USPTO dated Nov. 13, 2008 for U.S. Appl. No. 10/894,587".
"Office Action from USPTO dated Nov. 26, 2008 for U.S. Appl. No. 10/956,502".
"Office Action from USPTO dated Nov. 26, 2008 for U.S. Appl. No. 10/894,547".
"Final Office Action from USPTO dated Dec. 24, 2008 for U.S. Appl. No. 10/894,726".
"Office Action from USPTO dated Dec. 23, 2008 for U.S. Appl. No. 10/798,468".
"Notice of Allowance from USPTO dated Dec. 30, 2008 for U.S. Appl. No. 11/037,922".
"Final Office Action from USPTO dated Jan. 21, 2009 for U.S. Appl. No. 10/894,827".
"Office Action from USPTO dated Jan. 17, 2009 for U.S. Appl. No. 10/894,586".
"Final Office Action from USPTO dated Jan. 26, 2009 for U.S. Appl. No. 10/895,175".
"Notice of Allowance from USPTO dated Feb. 10, 2009 for U.S. Appl. No. 10/894,595".
"Office Action from USPTO dated Feb. 17, 2009 for U.S. Appl. No. 10/894,732".
"Notice of Allowance from USPTO dated Feb. 25, 2009 for U.S. Appl. No. 10/894,827".
"Notice of Allowance from USPTO dated Feb. 27, 2009 for U.S. Appl. No. 10/895,175".
"Notice of Allowance from USPTO dated Mar. 6, 2009 for U.S. Appl. No. 10/956,502".
"Office Action from USPTO dated Mar. 9, 2009 for U.S. Appl. No. 11/057,912".
"Notice of Allowance from USPTO dated Mar. 9, 2009 for U.S. Appl. No. 10/889,635".
"Office Action from USPTO dated Mar. 16, 2009 for U.S. Appl. No. 10/956,501".
"Notice of Allowance from USPTO dated Mar. 20, 2009 for U.S. Appl. No. 10/894,978".
"Notice of Allowance from USPTO dated Mar. 23, 2009 for U.S. Appl. No. 12/198,644".
"Office Action from USPTO dated Mar. 25, 2009 for U.S. Appl. No. 10/894,546".
"Notice of Allowance from USPTO dated Mar. 31, 2009 for U.S. Appl. No. 12/031,585".
"Office Action from USPTO dated Apr. 2, 2009 for U.S. Appl. No. 10/889,256".
"Examination Report from European Patent Office dated Mar. 27, 2009 for European Application No. 05798761.2".

* cited by examiner

TABLE I: Cut-Through Routing Frame Length Calculations

| Amount of max Length Frame Received | RPORT RX_Rate =1G | | | | RPORT RX_Rate =2G | | | | RPORT RX_Rate =4G | | | |
|---|---|---|---|---|---|---|---|---|---|---|---|---|
| | 10G Cut | 8G Cut | 4G Cut | 2G Cut | 10G Cut | 8G Cut | 4G Cut | 2G Cut | 10G Cut | 8G Cut | 4G Cut | 2G Cut |
| 0/0<rcvd<1/3 | 0 | 0 | 0 | 0 | 0 | 0 | 0 | 1 | 0 | 0 | 1 | 1 |
| 1/3<rcvd<1/2 | 0 | 0 | 0 | 0 | 0 | 0 | 0 | 1 | 0 | 0 | 1 | 1 |
| 1/2<rcvd<2/3 | 0 | 0 | 0 | 1 | 0 | 0 | 1 | 1 | 0 | 1 | 1 | 1 |
| 2/3<rcvd<3/4 | 0 | 0 | 0 | 1 | 0 | 0 | 1 | 1 | 1 | 1 | 1 | 1 |
| 3/4<rcvd<5/6 | 0 | 0 | 1 | 1 | 0 | 1 | 1 | 1 | 1 | 1 | 1 | 1 |
| 5/6<rcvd<7/8 | 0 | 1 | 1 | 1 | 1 | 1 | 1 | 1 | 1 | 1 | 1 | 1 |
| 7/8<rcvd<11/12 | 0 | 1 | 1 | 1 | 1 | 1 | 1 | 1 | 1 | 1 | 1 | 1 |
| 11/12<rcvd<EOF | 1 | 1 | 1 | 1 | 1 | 1 | 1 | 1 | 1 | 1 | 1 | 1 |
| EOF Received | 1 | 1 | 1 | 1 | 1 | 1 | 1 | 1 | 1 | 1 | 1 | 1 |

FIGURE 9-(i)

| RPORT RX_Rate =8G | | | | RPORT RX_Rate =10G | | | |
|---|---|---|---|---|---|---|---|
| 10G Cut | 8G Cut | 4G Cut | 2G Cut | 10G Cut | 8G Cut | 4G Cut | 2G Cut |
| 0 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |

METHOD AND SYSTEM FOR CONFIGURING FIBRE CHANNEL PORTS

CROSS REFERENCE TO RELATED APPLICATIONS

This application claims priority under 35 U.S.C.§ 119(e)(1) to the following provisional patent applications:

Filed on Sep. 19, 2003, Ser. No. 60/503,812, entitled "Method and System for Fibre Channel Switches";

Filed on Jan. 21, 2004, Ser. No. 60/537,933 entitled "Method And System For Routing And Filtering Network Data Packets In Fibre Channel Systems";

Filed on Jul. 21, 2003, Ser. No. 60/488,757, entitled "Method and System for Selecting Virtual Lanes in Fibre Channel Switches";

Filed on Dec. 29, 2003, Ser. No. 60/532,965, entitled "Programmable Pseudo Virtual Lanes for Fibre Channel Systems";

Filed on Sep. 19, 2003, Ser. No. 60/504,038, entitled "Method and System for Reducing Latency and Congestion in Fibre Channel Switches;

Filed on Aug. 14, 2003, Ser. No. 60/495,212, entitled "Method and System for Detecting Congestion and Over Subscription in a Fibre channel Network";

Filed on Aug. 14, 2003, Ser. No. 60/495,165, entitled "LUN Based Hard Zoning in Fibre Channel Switches";

Filed on Sep. 19, 2003, Ser. No. 60/503,809, entitled "Multi Speed Cut Through Operation in Fibre Channel Switches";

Filed on Sep. 23, 2003, Ser. No. 60/505,381, entitled "Method and System for Improving bandwidth and reducing Idles in Fibre Channel Switches";

Filed on Sep. 23, 2003, Ser. No. 60/505,195, entitled "Method and System for Keeping a Fibre Channel Arbitrated Loop Open During Frame Gaps";

Filed on Mar. 30, 2004, Ser. No. 60/557,613, entitled "Method and System for Congestion Control based on Optimum Bandwidth Allocation in a Fibre Channel Switch";

Filed on Sep. 23, 2003, Ser. No. 60/505,075, entitled "Method and System for Programmable Data Dependent Network Routing";

Filed on Sep. 19, 2003, Ser. No. 60/504,950, entitled "Method and System for Power Control of Fibre Channel Switches";

Filed on Dec. 29, 2003, Ser. No. 60/532,967, entitled "Method and System for Buffer to Buffer Credit recovery in Fibre Channel Systems Using Virtual and/or Pseudo Virtual Lane";

Filed on Dec. 29, 2003, Ser. No. 60/532,966, entitled "Method And System For Using Extended Fabric Features With Fibre Channel Switch Elements";

Filed on Mar. 4, 2004, Ser. No. 60/550,250, entitled "Method And System for Programmable Data Dependent Network Routing";

Filed on May 7, 2004, Ser. No. 60/569,436, entitled "Method And System For Congestion Control In A Fibre Channel Switch";

Filed on May 18, 2004, Ser. No. 60/572,197, entitled "Method and System for Configuring Fibre Channel Ports" and Filed on Dec. 29, 2003, Ser. No. 60/532,963 entitled "Method and System for Managing Traffic in Fibre Channel Switches".

The disclosure of the foregoing applications is incorporated herein by reference in their entirety.

BACKGROUND

1. Field of the Invention

The present invention relates to fibre channel systems, and more particularly to configuring fibre channel ports.

2. Background of the Invention

Fibre channel is a set of American National Standard Institute (ANSI) standards, which provide a serial transmission protocol for storage and network protocols such as HIPPI, SCSI, IP, ATM and others. Fibre channel provides an input/output interface to meet the requirements of both channel and network users.

Fibre channel supports three different topologies: point-to-point, arbitrated loop and fibre channel fabric. The point-to-point topology attaches two devices directly. The arbitrated loop topology attaches devices in a loop. The fibre channel fabric topology attaches host systems directly to a fabric, which are then connected to multiple devices. The fibre channel fabric topology allows several media types to be interconnected.

Fibre channel is a closed system that relies on multiple ports to exchange information on attributes and characteristics to determine if the ports can operate together. If the ports can work together, they define the criteria under which they communicate.

In fibre channel, a path is established between two nodes where the path's primary task is to transport data from one point to another at high speed with low latency, performing only simple error detection in hardware.

Fibre channel fabric devices include a node port or "N_Port" that manages fabric connections. The N_port establishes a connection to a fabric element (e.g., a switch) having a fabric port or F_port. Fabric elements include the intelligence to handle routing, error detection, recovery, and similar management functions.

A fibre channel switch is a multi-port device where each port manages a simple point-to-point connection between itself and its attached system. Each port can be attached to a server, peripheral, I/O subsystem, bridge, hub, router, or even another switch. A switch receives messages from one port and automatically routes it to another port. Multiple calls or data transfers happen concurrently through the multi-port fibre channel switch.

Fibre channel switches use memory buffers to hold frames received and sent across a network. Associated with these buffers are credits, which are the number of frames that a buffer can hold per fabric port.

Fibre channel links/ports can operate (i.e. receive an/or transmit data) in different speeds, for example, 1.065 gigabit per second ("G"), 2 G, 4 G, 8 G and now 10 G. 10 G ports can be implemented using a single link supporting a serial stream of 10.5 G serial data stream or by four physical lanes of 3.1875 G serial data stream where each lane carries 1 byte of a 4-byte transmitted word.

The base clock rate for 10 G ports is not an even multiple of 1 G/2 G/4 G/8 G rate, which means that conventional 10 G ports cannot easily be scaled down to operate at 1 G/2 G/4 G/8 G. Although 10 G as a standard is gaining popularity, there are many legacy devices that still operate and will continue to operate at lower data rates (1 G/2 G/4 G/8 G).

Typically, 1 G/2 G/4 G ports use a standard fibre Channel negotiation procedure to support a particular speed, allowing for example, a 4 G port to negotiate with a 1 G or 2 G port.

However, this negotiation procedure is not available for a 10 G port per the current fibre channel standards, which will allow a 10 G port to operate at a lower rate.

Therefore, it is desirable to have a single fibre channel switch element on a single chip that can handle high 10 G throughput and be configured to operate at lower rates, for example, 1 G/2 G/4 G/8 G.

SUMMARY OF THE PRESENT INVENTION

In one aspect of the present invention, a fibre channel switch element for routing fibre channel frame is provided. The switch element includes a fibre channel port that can be configured to support plural data transfer rates. The data transfer rate may be 1 G, 2 G, 4 G, 8 G or 10 G.

The switch element includes a clock configuration module for providing a clock signal that is based on the data transfer rate.

A receive segment of the fibre channel port sends a signal to a transmit segment to avoid an under flow condition. The receive segment also waits for a certain frame length after a fibre channel frame is written and before the fibre channel frame is read, depending upon a data transfer rate of a source port.

Multiple lanes may be configured as a single 10 G multi lane port or as multiple individual ports. Transmit and receive pipelines may be shared between all port speeds; or transmit and receive pipelines may be separate for each port speed or shared between some ports but not shared by all ports.

A receive buffer is shared for multiple lanes when configured to operate with a multi-rate port. Also, a receive buffer is used for each lane when a port is configured to operate at different rates.

Each lane configured as individual independent port may operate at different rates independently. Also, a port can auto-negotiate between all port rates.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures:

FIGS. 9-i/9-ii (referred to herein as FIG. 9) shows a table for establishing "cut" through rates for transmitting frames based on port speed, according tone aspect of the present invention.

DETAILED DESCRIPTION OF THE PREFERRED EMBODIMENTS

Definitions

The following definitions are provided as they are typically (but not exclusively) used in the fibre channel environment, implementing the various adaptive aspects of the present invention.

"E_Port": A fabric expansion port that attaches to another Interconnect port to create an Inter-Switch Link.

"F_Port": A port to which non-loop N_Ports are attached to a fabric and does not include FL_ports.

"Fibre Channel ANSI Standard": The standard (incorporated herein by reference in its entirety) describes the physical interface, transmission and signaling protocol of a high performance serial link for support of other high level protocols associated with IPI, SCSI, IP, ATM and others.

"FC-1": Fibre channel transmission protocol, which includes serial encoding, decoding and error control.

"FC-2": Fibre channel signaling protocol that includes frame structure and byte sequences.

"FC-3": Defines a set of fibre channel services that are common across plural ports of a node.

"FC-4": Provides mapping between lower levels of fibre channel, IPI and SCSI command sets, HIPPI data framing, IP and other upper level protocols.

"Fabric": The structure or organization of a group of switches, target and host devices (NL_Port, N_ports etc.).

"Fabric Topology": This is a topology where a device is directly attached to a fibre channel fabric that uses destination identifiers embedded in frame headers to route frames through a fibre channel fabric to a desired destination.

Port: A general reference to N. Sub.—Port or F.Sub.—Port.

"L_Port": A port that contains Arbitrated Loop functions associated with the Arbitrated Loop topology.

"N-Port": A direct fabric attached port.

"NL_Port": A L_Port that can perform the function of a N_Port.

"Switch": A fabric element conforming to the Fibre Channel Switch standards.

Fibre Channel System:

To facilitate an understanding of the preferred embodiment, the general architecture and operation of a fibre channel system will be described. The specific architecture and operation of the preferred embodiment will then be described with reference to the general architecture of the fibre channel system.

Figure 1A:
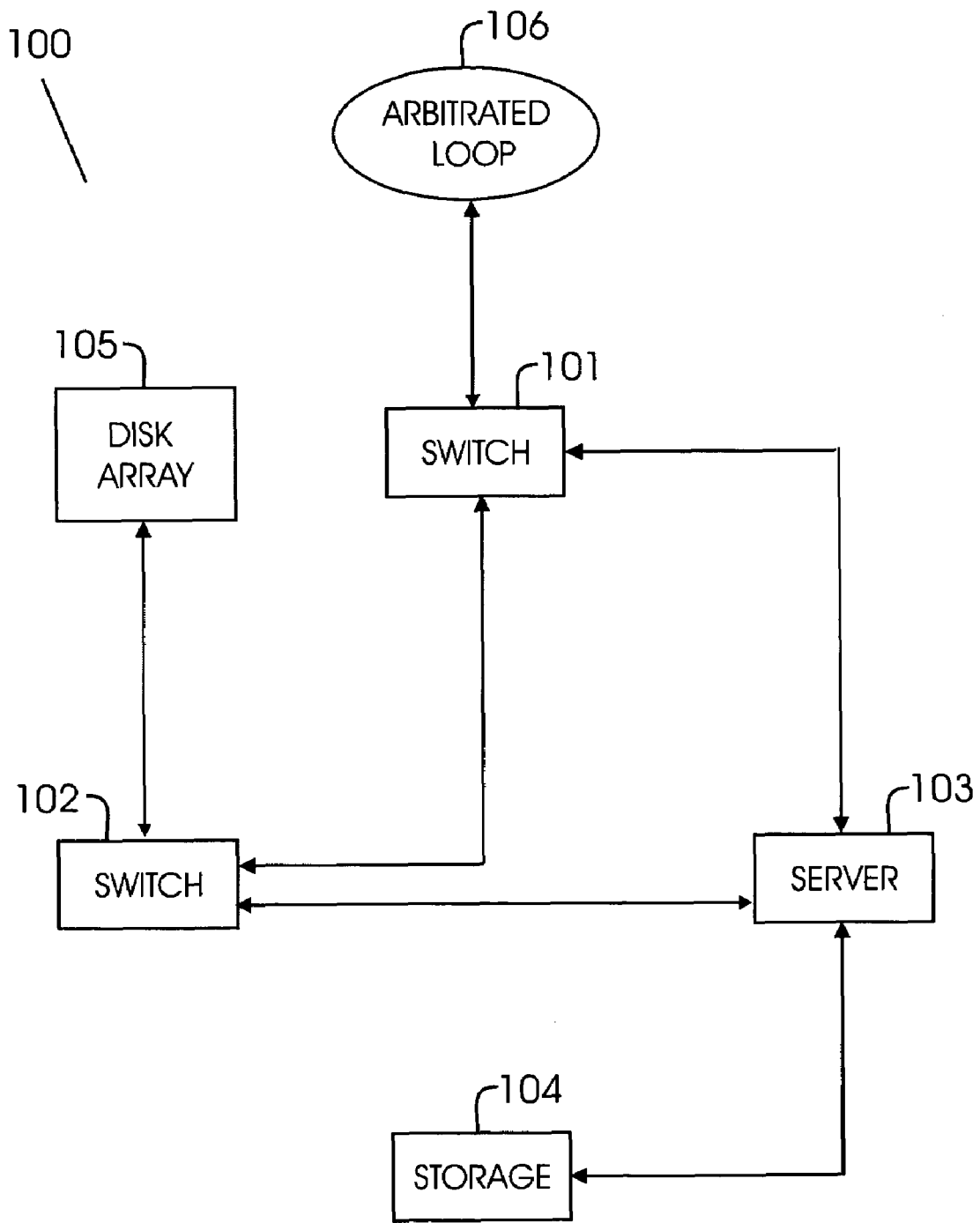
FIG. 1A shows an example of a Fibre Channel network system.

FIG. 1A is a block diagram of a fibre channel system 100 implementing the methods and systems in accordance with the adaptive aspects of the present invention. System 100 includes plural devices that are interconnected. Each device includes one or more ports, classified as node ports (N_Ports), fabric ports (F_Ports), and expansion ports (E_Ports). Node ports may be located in a node device, e.g. server 103, disk array 105 and storage device 104. Fabric ports are located in fabric devices such as switch 101 and 102. Arbitrated loop 106 may be operationally coupled to switch 101 using arbitrated loop ports (FL_Ports).

The devices of FIG. 1A are operationally coupled via "links" or "paths". A path may be established between two N_ports, e.g. between server 103 and storage 104. A packet-switched path may be established using multiple links, e.g. an N-Port in server 103 may establish a path with disk array 105 through switch 102.

Fabric Switch Element

Figure 1B:
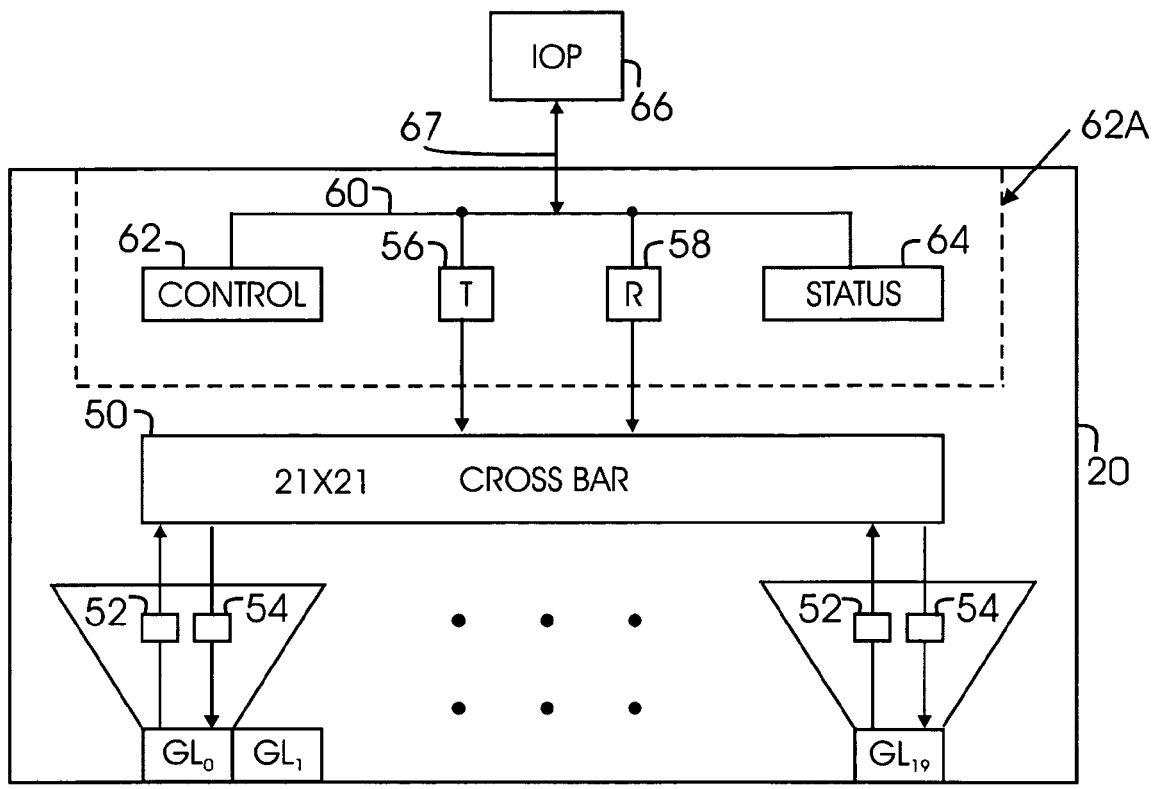
FIG. 1B shows an example of a Fibre Channel switch element, according to one aspect of the present invention.

FIG. 1B is a block diagram of a 20-port ASIC ("Application Specific Integrated Circuit" fabric element according to one aspect of the present invention. FIG. 1B provides the general architecture of a 20-channel switch chassis using the 20-port fabric element. Fabric element includes ASIC 20 with non-blocking fibre channel class 2 (connectionless, acknowledged) and class 3 (connectionless, unacknowledged) service between any ports. It is noteworthy that ASIC 20 may also be designed for class 1 (connection-oriented) service, within the scope and operation of the present invention as described herein.

The fabric element of the present invention is presently implemented as a single CMOS ASIC, and for this reason the term "fabric element" and ASIC are used interchangeably to refer to the preferred embodiments in this specification. Although FIG. 1B shows 20 ports, the present invention is not limited to any particular number of ports.

ASIC 20 has 20 ports numbered in FIG. 1B as GL0 through GL19. These ports are generic to common Fibre Channel port types, for example, F_Port, FL_Port and E-Port. In other words, depending upon what it is attached to, each generic port (also referred to as GL Ports) can function as any type of port. Also, the GL port may function as a special port useful in fabric element linking, as described below.

For illustration purposes only, all GL ports are drawn on the same side of ASIC 20 in FIG. 1B. However, the ports may be located on both sides of ASIC 20 as shown in other figures. This does not imply any difference in port or ASIC design. Actual physical layout of the ports will depend on the physical layout of the ASIC.

Each port GL0-GL19 has transmit and receive connections to switch crossbar 50. One connection is through receive buffer 52, which functions to receive and temporarily hold a frame during a routing operation. The other connection is through a transmit buffer 54.

Switch crossbar 50 includes a number of switch crossbars for handling specific types of data and data flow control information. For illustration purposes only, switch crossbar 50 is shown as a single crossbar. Switch crossbar 50 is a connectionless crossbar (packet switch) of known conventional design, sized to connect 21×21 paths. This is to accommodate 20 GL ports plus a port for connection to a fabric controller, which may be external to ASIC 20.

Figure 1C:
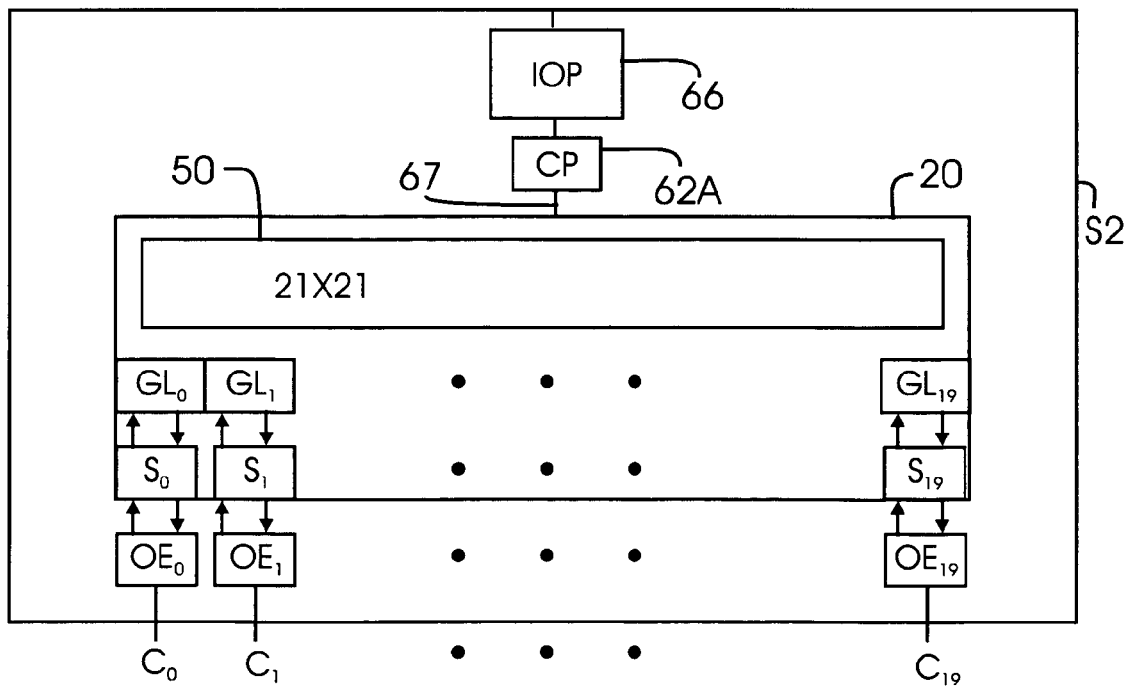
FIG. 1C shows a block diagram of a 20-channel switch chassis, according to one aspect of the present invention.

In the preferred embodiments of switch chassis described herein, the fabric controller is a firmware-programmed microprocessor, also referred to as the input/out processor ("IOP"). IOP 66 is shown in FIG. 1C as a part of a switch chassis utilizing one or more of ASIC 20. As seen in FIG. 1B, bi-directional connection to IOP 66 is routed through port 67, which connects internally to a control bus 60. Transmit buffer 56 (also referred to as "T"), receive buffer 58 (also referred to as "R"), control register 62 and Status register 64 connect to bus 60. Transmit buffer 56 and receive buffer 58 connect the internal connectionless switch crossbar 50 to IOP 66 so that it can source or sink frames.

Control register 62 receives and holds control information from IOP 66, so that IOP 66 can change characteristics or operating configuration of ASIC 20 by placing certain control words in register 62. IOP 66 can read status of ASIC 20 by monitoring various codes that are placed in status register 64 by monitoring circuits (not shown).

FIG. 1C shows a 20-channel switch chassis S2 using ASIC 20 and IOP 66. S2 will also include other elements, for example, a power supply (not shown). The 20 GL ports correspond to channel (also referred to as "C") C0-C19. Each GL port has a serial/deserializer (SERDES) (also referred to as "S") designated as S0-S19. Ideally, the SERDES functions are implemented on ASIC 20 for efficiency, but may alternatively be external to each GL port.

Each GL port has an optical-electric converter (also referred to as "OE"), designated as OE0-OE19 connected with its SERDES through serial lines, for providing fibre optic input/output connections, as is well known in the high performance switch design. The converters connect to switch channels C0-C19, It is noteworthy that the ports can connect through copper paths or other means instead of optical-electric converters.

Figure 1D:
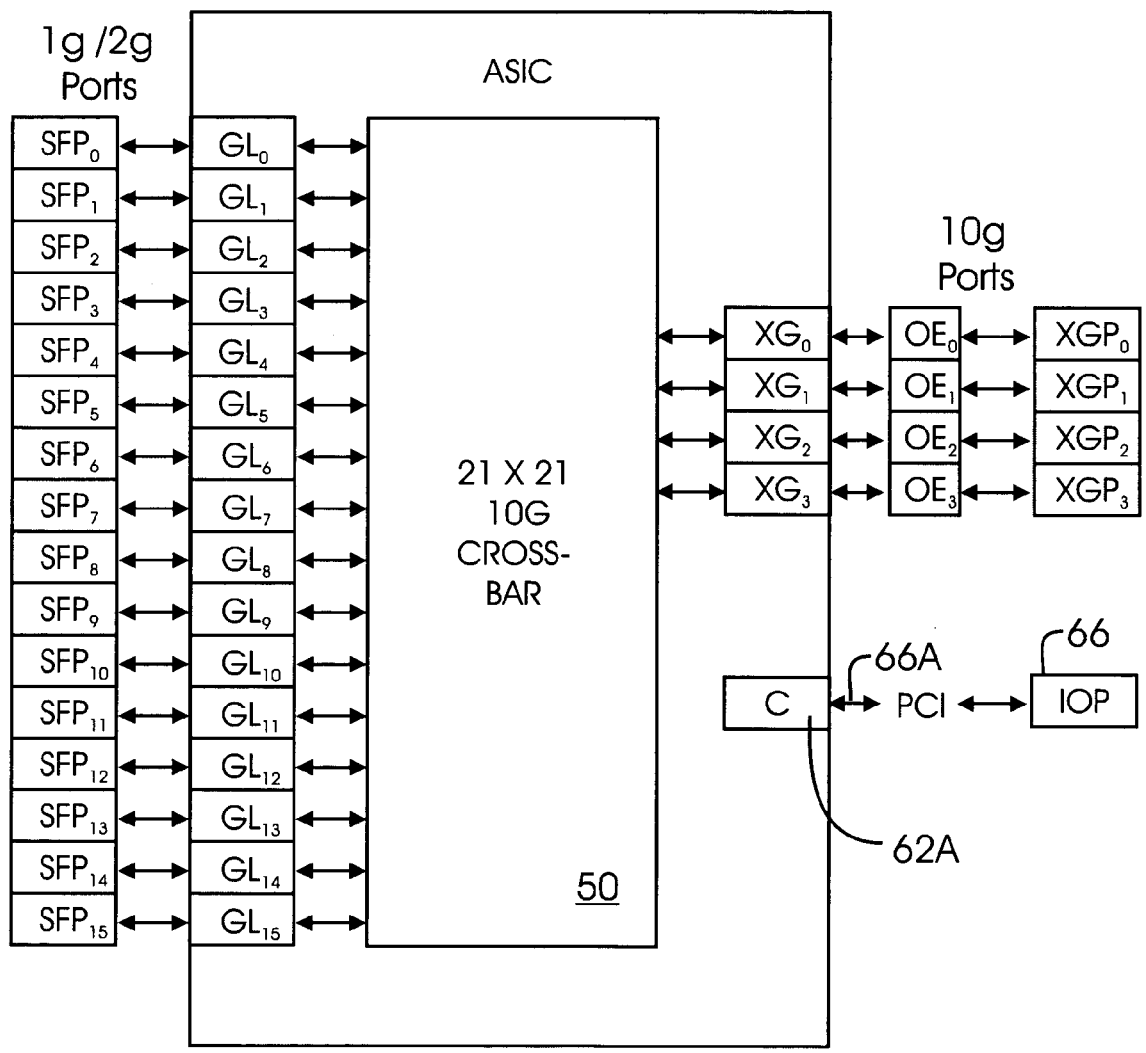
FIG. 1D shows a block diagram of a Fibre Channel switch element with sixteen GL_Ports and four 10 G ports, according to one aspect of the present invention.

FIG. 1D shows a block diagram of ASIC 20 with sixteen GL ports and four 10 G (Gigabyte) port control modules designated as $XG_0$-$XG_3$ for four 10 G ports designated as XGP0-XGP3. GL ports ($GL_0$-$GL_{15}$) communicate with 1 g/2 g SFP Port modules $SFP_0$-$SFP_{15}$. SFP is a small form factor pluggable optical transceiver. ASIC 20 include a control port 62A (also referred to as "CP") that is coupled to IOP 66 through a peripheral component interconnect "PCI" connection 66A.

Figures 1, 1E:
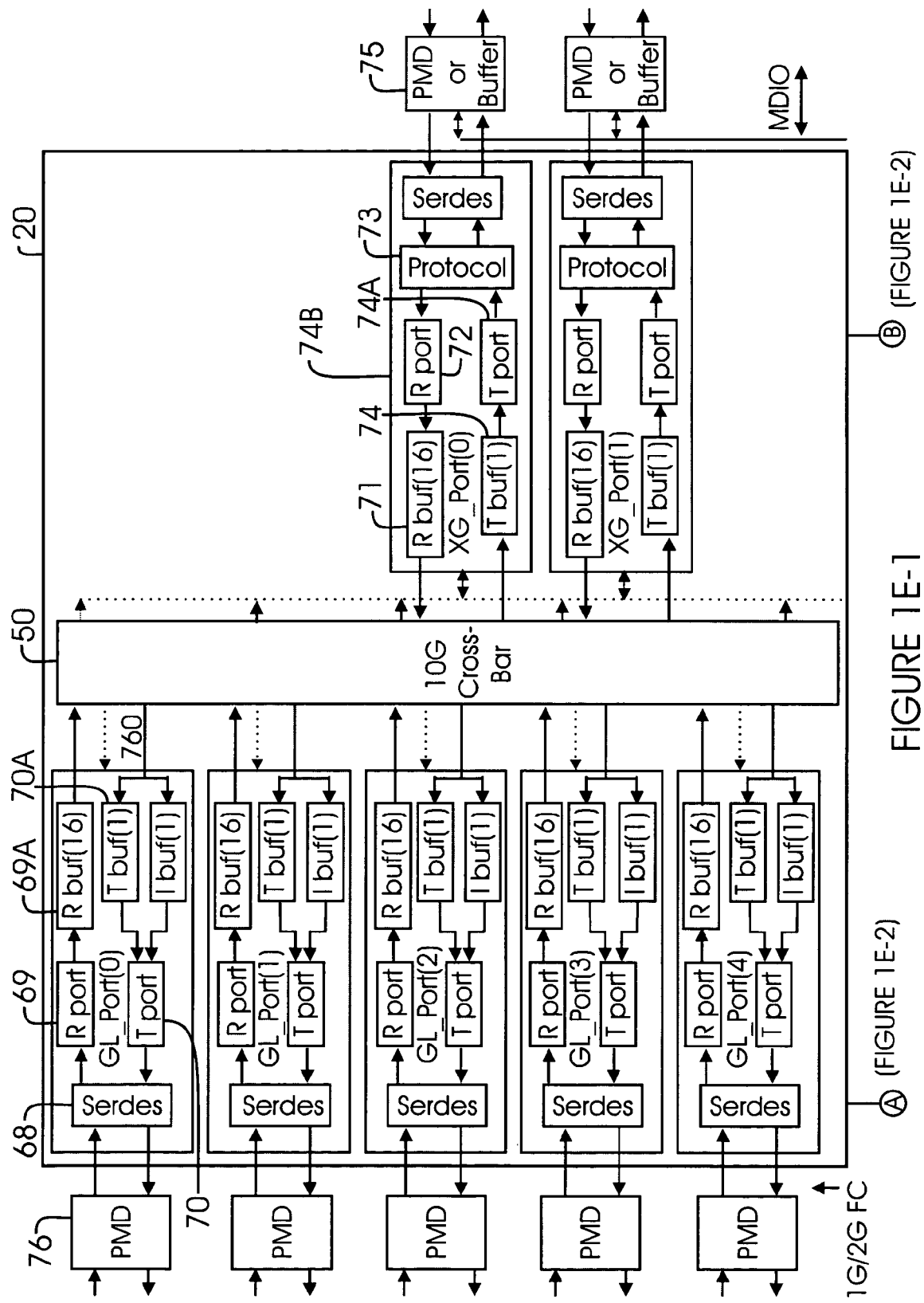
FIGS. 1E-1/1E-2 (jointly referred to as FIG. 1E) show another block diagram of a Fibre Channel switch element with sixteen GL_Ports and four 10 G ports, according to one aspect of the present invention.

FIG. 1E-1/1E-2 (jointly referred to as FIG. 1E) show yet another block diagram of ASIC 20 with sixteen GL and four XG port control modules. Each GL port control module has a Receive port (RPORT) 69 with a receive buffer (RBUF) 69A and a transmit port 70 with a transmit buffer (TBUF) 70A, as described below in detail. GL and XG port control modules are coupled to physical media devices ("PMD") 76 and 75 respectively.

Control port module 62A includes control buffers 62B and 62D for transmit and receive sides, respectively. Module 62A also includes a PCI interface module 62C that allows interface with IOP 66 via a PCI bus 66A.

XG_Port (for example 74B) includes RPORT 72 with RBUF 71 similar to RPORT 69 and RBUF 69A and a TBUF and TPORT similar to TBUF 70A and TPORT 70. Protocol module 73 interfaces with SERDES to handle protocol based functionality.

Figure 3A:
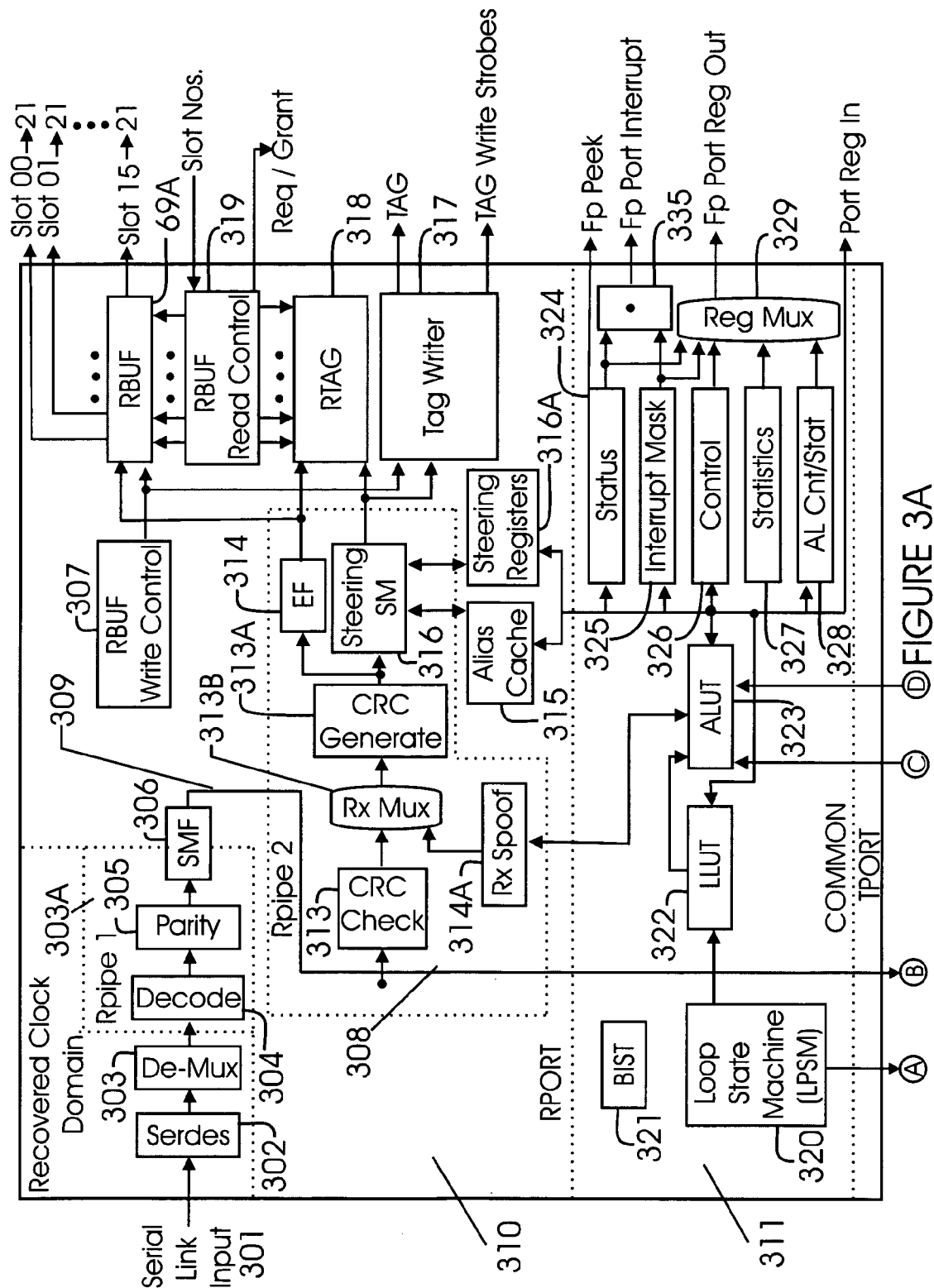
FIGS. 3A/3B (jointly referred to as FIG. 3) show a block diagram of a GL_Port, according to one aspect of the present invention.
Figure 3B:
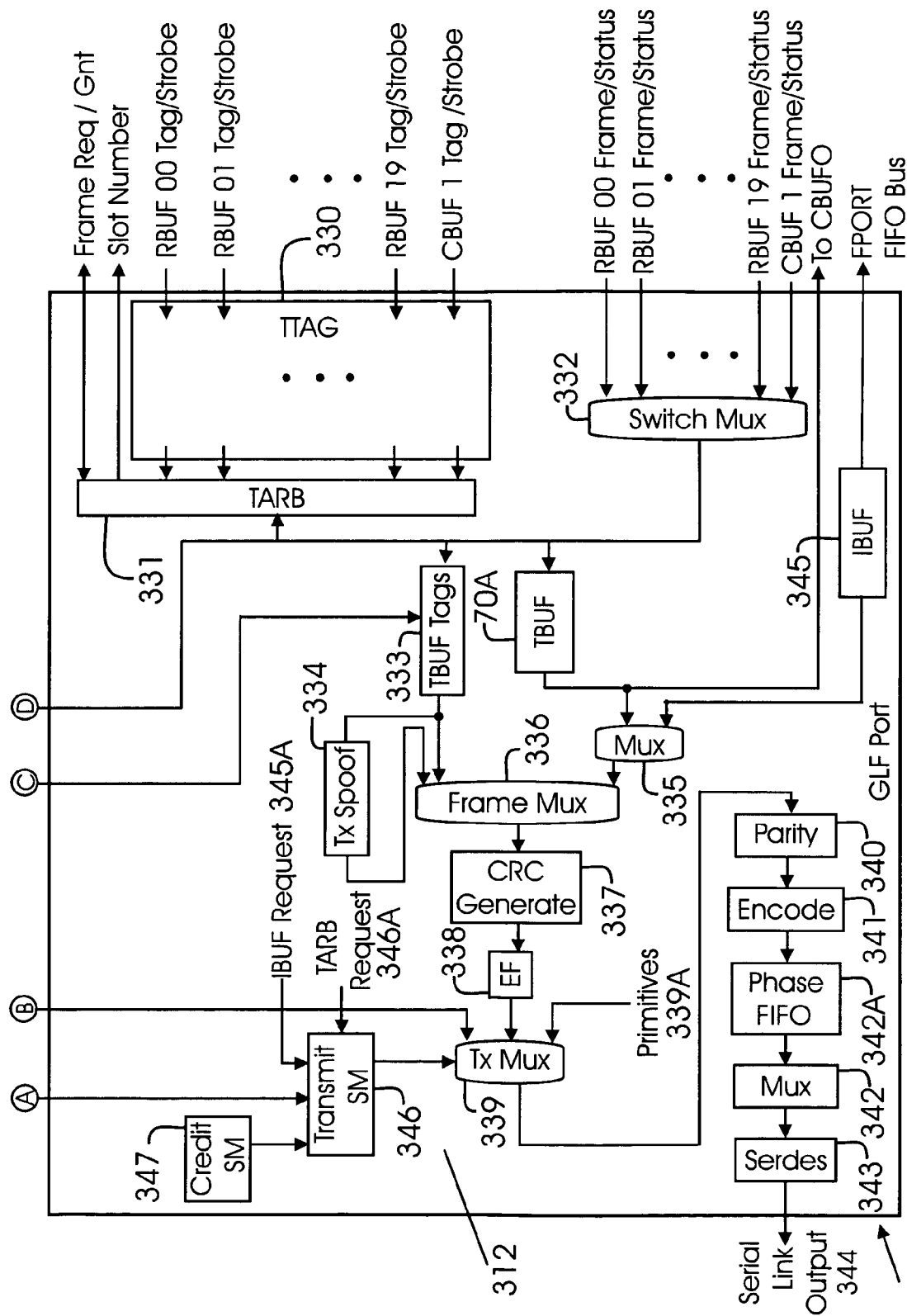

GL Port:

FIGS. 3A-3B (referred to as FIG. 3) show a detailed block diagram of GL port as used in ASIC 20. GL port 300 (also referred to as GLF Port) is shown in three segments, namely, receive segment (RPORT) 310, transmit segment (TPORT) 312 and common segment 311.

Receive Segment of GL_Port:

Frames enter through link 301 and SERDES 302 converts data into 10-bit parallel data to fibre channel characters, which are then sent to receive pipe ("Rpipe" (may also be shown as "Rpipe1" or "Rpipe2")) 303A via a de-multiplexer (DEMUX) 303. Rpipe 303A includes, parity module 305 and decoder 304. Decoder 304 decodes 10B data to 8B and parity module 305 adds a parity bit. Rpipe 303A also performs various Fibre Channel standard functions such as detecting a start of frame (SOF), end-of frame (EOF), Idles, R_RDYs (fibre channel standard primitive) and the like, which are not described since they are standard functions.

Rpipe 303A also connects to smoothing FIFO (SMF) module 306 that performs smoothing functions to accommodate clock frequency variations between remote transmitting and local receiving devices. Smoothing FIFO module 306 smoothens the difference between the clock recovered by SERDES 302 from the received data stream and the clock used for the data path on the receiving switch port.

Frames received by RPORT 310 are stored in receive buffer (RBUF) 69A, (except for certain Fibre Channel Arbitrated Loop (AL) frames). Path 309 shows the frame entry path, and all frames entering path 309 are written to RBUF 69A as opposed to the AL path 308.

Cyclic redundancy code (CRC) module 313 further processes frames that enter GL port 300 by checking CRC and processing errors according to FC_PH rules. The frames are subsequently passed to RBUF 69A where they are steered to an appropriate output link. RBUF 69A is a link receive buffer and can hold multiple frames.

Reading from and writing to RBUF 69A are controlled by RBUF read control logic ("RRD") 319 and RBUF write control logic ("RWT") 307, respectively. RWT 307 specifies which empty RBUF 69A slot will be written into when a frame arrives through the data link via multiplexer 313B, CRC generate module 313A and EF (external proprietary format) module 314. EF module 314 encodes proprietary (i.e. non-standard) format frames to standard Fibre Channel 8B codes. Mux 313B receives input from Rx Spoof module 314A, which encodes frames to a proprietary format (if enabled). RWT 307 controls RBUF 69A write addresses and provides the slot number to tag writer ("TWT") 317.

RRD 319 processes frame transfer requests from RBUF 69A. Frames may be read out in any order and multiple destinations may get copies of the frames.

Steering state machine (SSM or Steering SM) 316 receives frames and determines the destination for forwarding the frame. SSM 316 produces a destination mask, where there is one bit for each destination. Any bit set to a certain value, for example, 1, specifies a legal destination, and there can be multiple bits set, if there are multiple destinations for the same frame (multicast or broadcast).

SSM 316 makes this determination using information from an alias cache 315, steering registers 316A, control register 326 values and frame contents. IOP 66 writes all tables so that correct exit path is selected for the intended destination port addresses.

The destination mask from SSM 316 is sent to TWT 317 and a RBUF tag register (RTAG) 318. TWT 317 writes tags to all destinations specified in the destination mask from SSM 316. Each tag identifies its corresponding frame by containing an RBUF 69A slot number where the frame resides, and an indication that the tag is valid.

Each slot in RBUF 69A has an associated set of tags, which are used to control the availability of the slot. The primary tags are a copy of the destination mask generated by SSM 316. As each destination receives a copy of the frame, the destination mask in RTAG 318 is cleared. When all the mask bits are cleared, it indicates that all destinations have received a copy of the frame and that the corresponding frame slot in RBUF 69A is empty and available for a new frame.

RTAG 318 also has frame content information that is passed to a requesting destination to pre-condition the destination for the frame transfer. These tags are transferred to the destination via a read multiplexer (RMUX) (not shown).

Transmit Segment of GL_Port:

Transmit segment ("TPORT") 312 performs various transmit functions. Transmit tag register (TTAG) 330 provides a list of all frames that are to be transmitted. Tag Writer 317 or common segment 311 write TTAG 330 information. The frames are provided to arbitration module ("transmit arbiter" ("TARB")) 331, which is then free to choose which source to process and which frame from that source to be processed next.

TTAG 330 includes a collection of buffers (for example, buffers based on a first-in first out ("FIFO") scheme) for each frame source. TTAG 330 writes a tag for a source and TARB 331 then reads the tag. For any given source, there are as many entries in TTAG 330 as there are credits in RBUF 69A.

TARB 331 is activated anytime there are one or more valid frame tags in TTAG 330. TARB 331 preconditions its controls for a frame and then waits for the frame to be written into TBUF 70A. After the transfer is complete, TARB 331 may request another frame from the same source or choose to service another source.

TBUF 70A is the path to the link transmitter. Typically, frames don't land in TBUF 70A in their entirety. Mostly, frames simply pass through TBUF 70A to reach output pins, if there is a clear path.

Switch Mux 332 is also provided to receive output from crossbar 50. Switch Mux 332 receives input from plural RBUFs (shown as RBUF 00 to RBUF 19), and input from CPORT 62A shown as CBUF 1 frame/status. TARB 331 determines the frame source that is selected and the selected source provides the appropriate slot number. The output from Switch Mux 332 is sent to ALUT 323 for S_ID spoofing and the result is fed into TBUF Tags 333.

TMUX (or "TxMUX") 339 chooses which data path to connect to the transmitter. The sources are: primitive sequences specified by IOP 66 via control registers 326 (shown as primitive 339A), and signals as specified by Transmit state machine ("TSM") 346, frames following the loop path, or steered frames exiting the fabric via TBUF 70A.

TSM 346 chooses the data to be sent to the link transmitter, and enforces all fibre Channel rules for transmission. TSM 346 receives requests to transmit from loop state machine 320, TBUF 70A (shown as TARB request 346A) and from various other IOP 66 functions via control registers 326 (shown as IBUF Request 345A). TSM 346 also handles all credit management functions, so that Fibre Channel connectionless frames are transmitted only when there is link credit to do so.

Loop state machine ("LPSM") 320 controls transmit and receive functions when GL_Port is in a loop mode. LPSM 320 operates to support loop functions as specified by FC-AL-2.

IOP buffer ("IBUF") 345 provides IOP 66 the means for transmitting frames for special purposes.

Frame multiplexer ("Frame Mux" or "Mux") 336 chooses the frame source, while logic (TX spoof 334) converts D_ID and S_ID from public to private addresses. Frame Mux 336 receives input from Tx Spoof module 334, TBUF tags 333, and Mux 335 to select a frame source for transmission.

EF module 338 encodes proprietary (i.e. non-standard) format frames to standard Fibre Channel 8B codes and CRC module 337 generates CRC data for the outgoing frames.

Modules 340-343 put a selected transmission source into proper format for transmission on an output link 344. Parity 340 checks for parity errors, when frames are encoded from 8B to 10B by encoder 341, marking frames "invalid", according to Fibre Channel rules, if there was a parity error. Phase FIFO 342A receives frames from encode module 341 and the frame is selected by Mux 342 and passed to SERDES 343. SERDES 343 converts parallel transmission data to serial before passing the data to the link media. SERDES 343 may be internal or external to ASIC 20. Modules 340-343 are also referred below as a "transmit pipe".

SERDES 343 converts parallel transmission data received from Mux 342 (that is received from FIFO 342A) to serial before passing the data to the link media. SERDES 343 may be internal or external to ASIC 20.

Common Segment of GL_Port:

As discussed above, ASIC 20 include common segment 311 comprising of various modules. LPSM 320 has been described above and controls the general behavior of TPORT 312 and RPORT 310.

A loop look up table ("LLUT") 322 and an address look up table ("ALUT") 323 is used for private loop proxy addressing and hard zoning managed by firmware.

Common segment 311 also includes control register 326 that controls bits associated with a GL_Port, status register 324 that contains status bits that can be used to trigger interrupts, and interrupt mask register 325 that contains masks to determine the status bits that will generate an interrupt to IOP 66. Common segment 311 also includes AL control and status register 328 and statistics register 327 that provide accounting information for FC management information base ("MIB").

Output from status register 324 may be used to generate a Fp Peek function. This allows a status register 324 bit to be viewed and sent to the CPORT.

Output from control register 326, statistics register 327 and register 328 (as well as credit counters 328A for an X_Port, shown in FIG. 4) is sent to Mux 329 that generates an output signal (FP Port Reg Out).

Output from Interrupt register 325 and status register 324 is sent to logic 335 to generate a port interrupt signal (FP Port Interrupt).

BIST module 321 is used for conducting embedded memory testing.

XG_Port

Figure 4A:
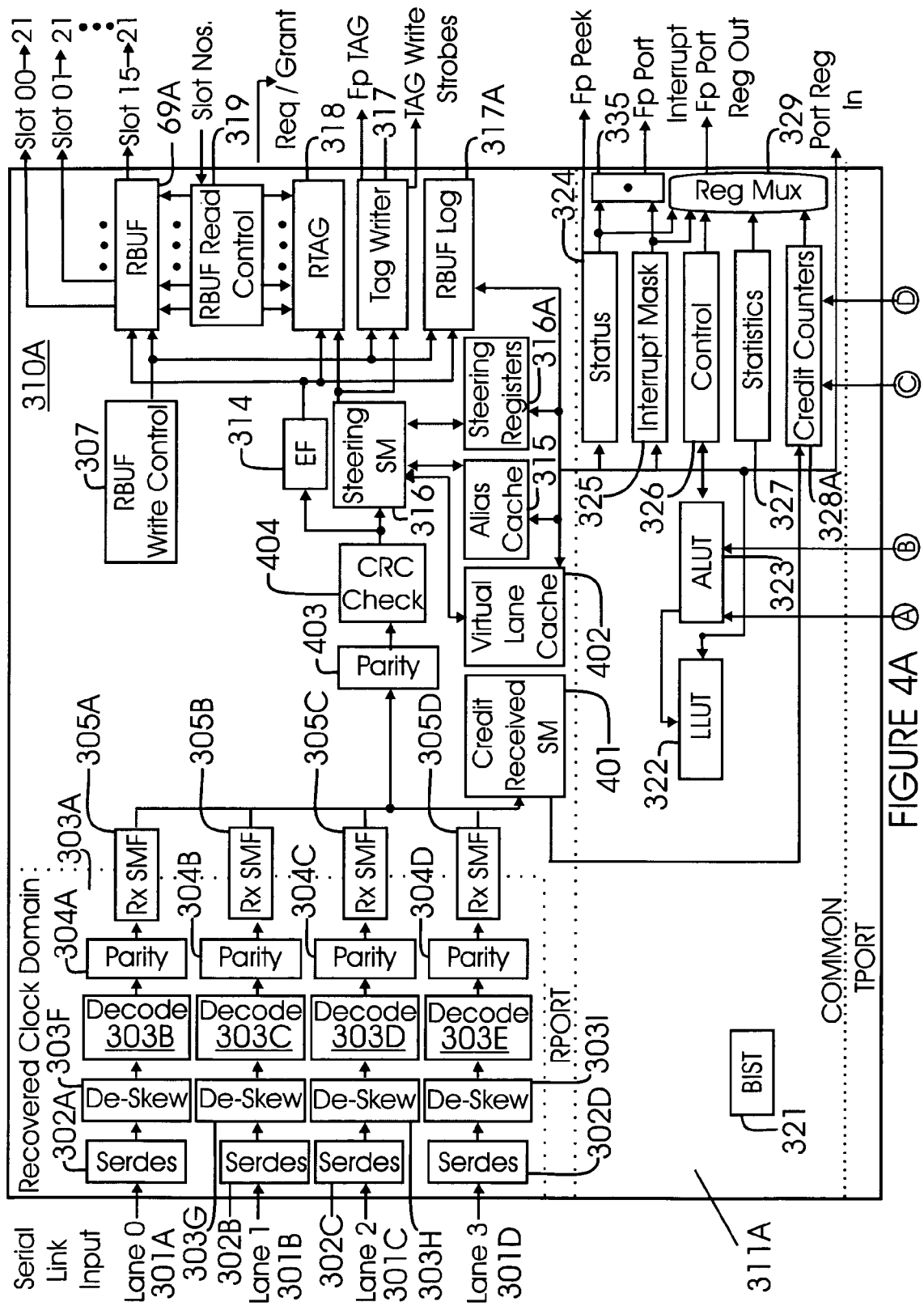
FIGS. 4A/4B (jointly referred to as FIG. 3) show a block diagram of XG_Port (10 G) port, according to one aspect of the present invention.
Figure 4B:
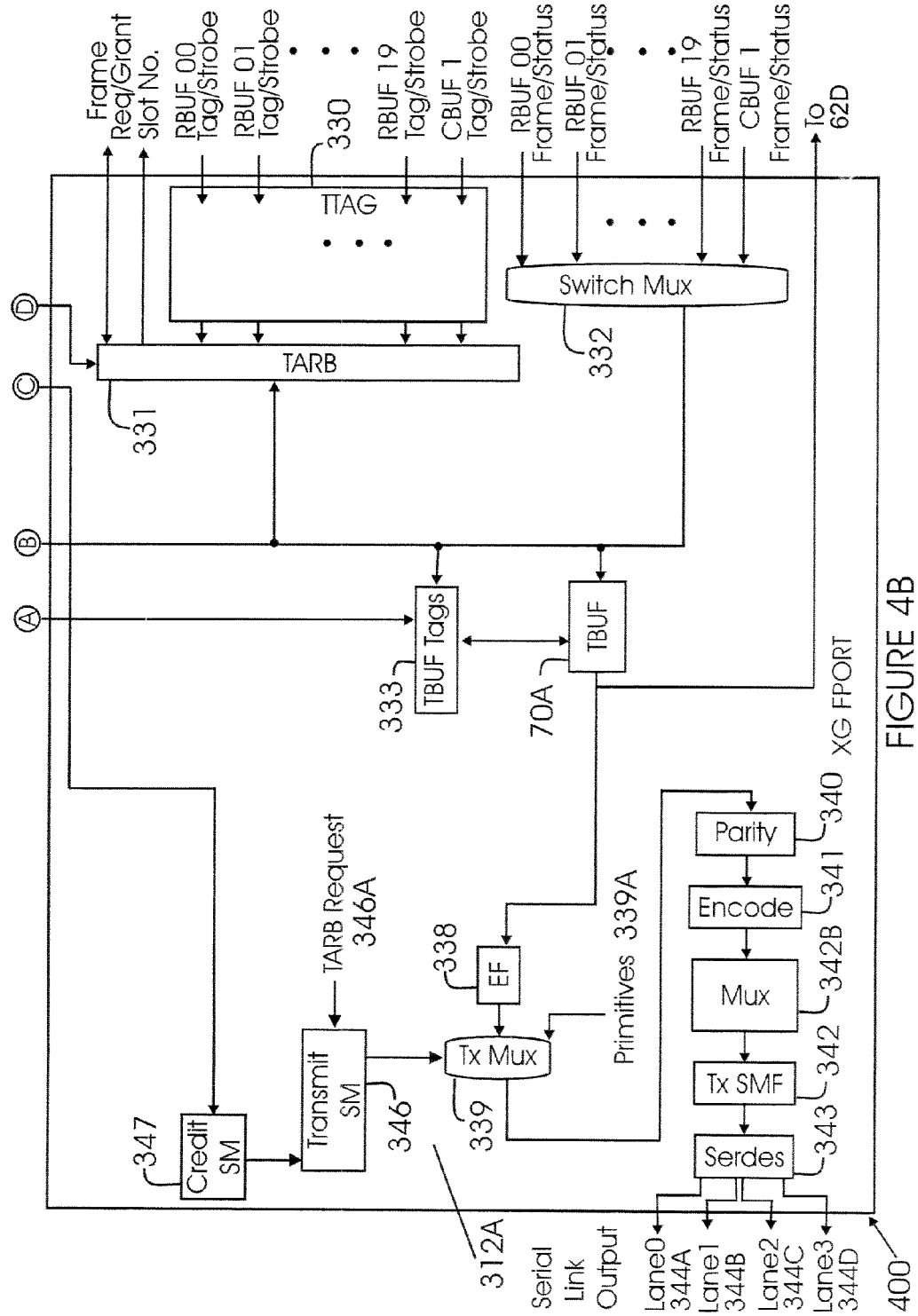

FIGS. 4A-4B (referred to as FIG. 4) show a block diagram of a 10 G Fibre Channel port control module (XG FPORT) 400 used in ASIC 20. Various components of XG FPORT 400 are similar to GL port control module 300 that are described above. For example, RPORT 310 and 310A, Common Port 311 and 311A, and TPORT 312 and 312A have common modules as shown in FIGS. 3 and 4 with similar functionality.

RPORT 310A can receive frames from links (or lanes) 301A-301D and transmit frames to lanes 344A-344D. Each link has a SERDES (302A-302D), a de-skew module (303F-303I), a decode module (303B-303E) and parity module (304A-304D). Each lane also has a smoothing FIFO (SMF) module 305A-305D that performs smoothing functions to accommodate clock frequency variations. Parity errors are checked by module 403, while CRC errors are checked by module 404. RPORT 310A also a credit state machine 401 to manage credit.

RPORT 310A uses a virtual lane ("VL") cache 402 that stores plural vector values that are used for virtual lane assignment. In one aspect of the present invention, VL Cache 402 may have 32 entries and two vectors per entry. IOP 66 is able to read or write VL cache 402 entries during frame traffic. State machine 401 controls credit that is received. On the transmit side, credit state machine 347 controls frame transmission based on credit availability. State machine 347 interfaces with credit counters 328A.

Also on the transmit side, modules 340-343 are used for each lane 344A-344D, i.e., each lane can have its own module 340-343. Parity module 340 checks for parity errors and encode module 341 encodes 8-bit data to 10 bit data. Mux 342B sends the 10-bit data to a smoothing FIFO ("TxSMF") module 342 that handles clock variation on the transmit side. SERDES 343 then sends the data out to the link.

Port Configuration:

FIGS. 5-8 show various port configuration options that allow a single 10 G port (for example, XG_Port of FIG. 4) to be configured as 1 G/2 G/4 G/8 G port. It is noteworthy that 10 G as applied to fibre channel switch elements and devices has a different meaning than 1 G/2 G/4 G, which refer to raw bits as transmitted (i.e., 10 bits per byte and 40 bits per word after the 8 bit to 10 bit coding defined by the fibre Channel standards). The 10 G rate refers to the row of bits as transmitted. The actual 8-bit data delivered after decoding on a 10 G link is approximately the same 8-bit data delivered at 12 gigabits/second using 8-bit/10-bit coding.

Fibre channel ports use a serial data stream of 10 bit-encoded characters. As discussed above, SERDES 343 converts parallel 10 bit data into a serial stream for transmission and SERDES 302 converts the received data stream into 10 bit characters. The encoding of characters and use of 4 character words allows a SERDES (302 or 343) to recognize character and word boundaries and to recover clock data from the received data.

Typically, 1 G/2 G/4 G/8 G port uses a single serial stream (FIG. 3, 301), while a 10 G port uses 4 serial streams (301A-301D, FIG. 4A) each at 3.187 gigabaud (per the 10 GFC fibre channel standard, incorporated herein by reference in its entirety.

Figure 5:
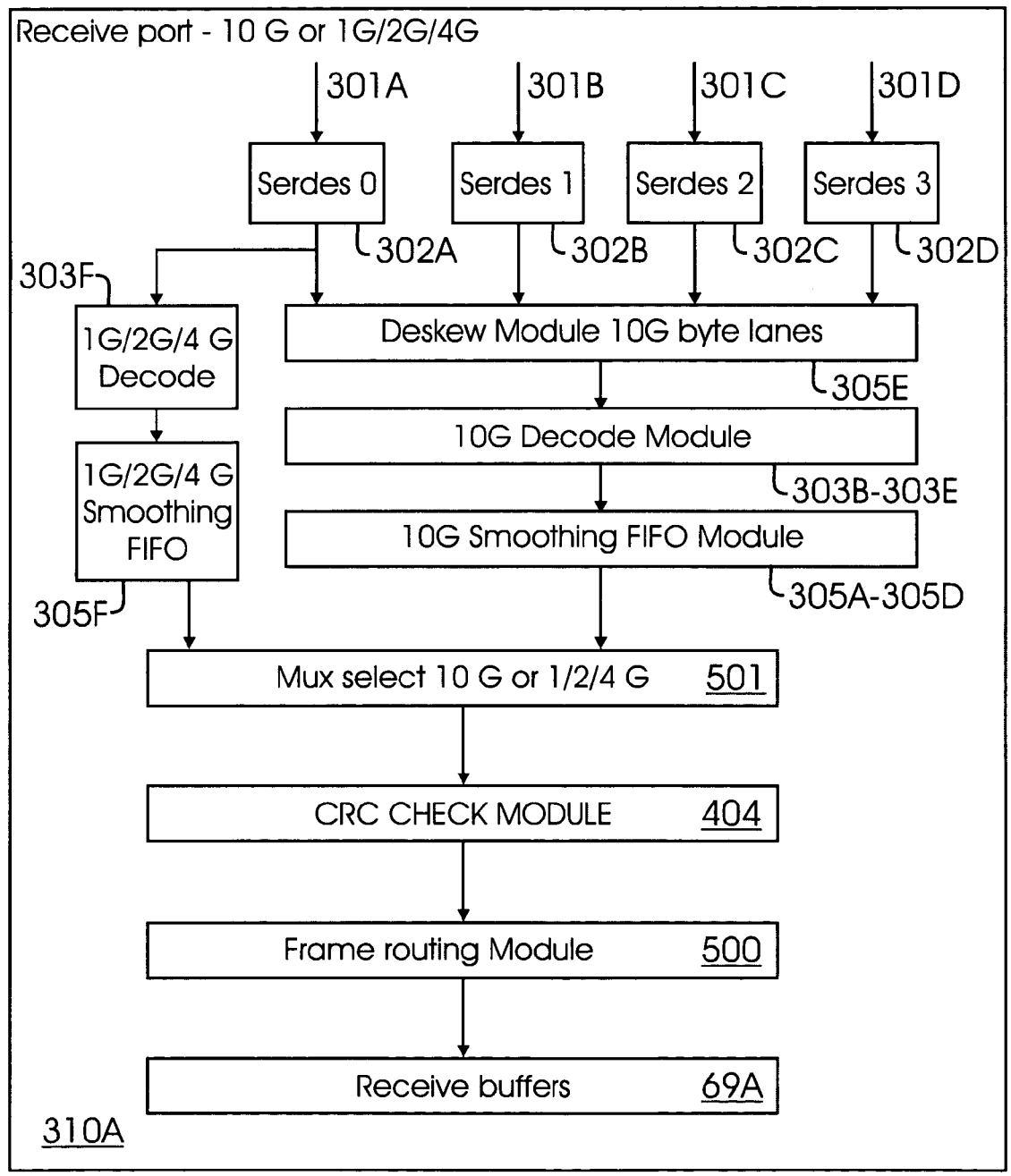
FIG. 5 shows a block diagram of a receive port for a switch element that can be used at different rates, according to one aspect of the present invention.
Figure 6:
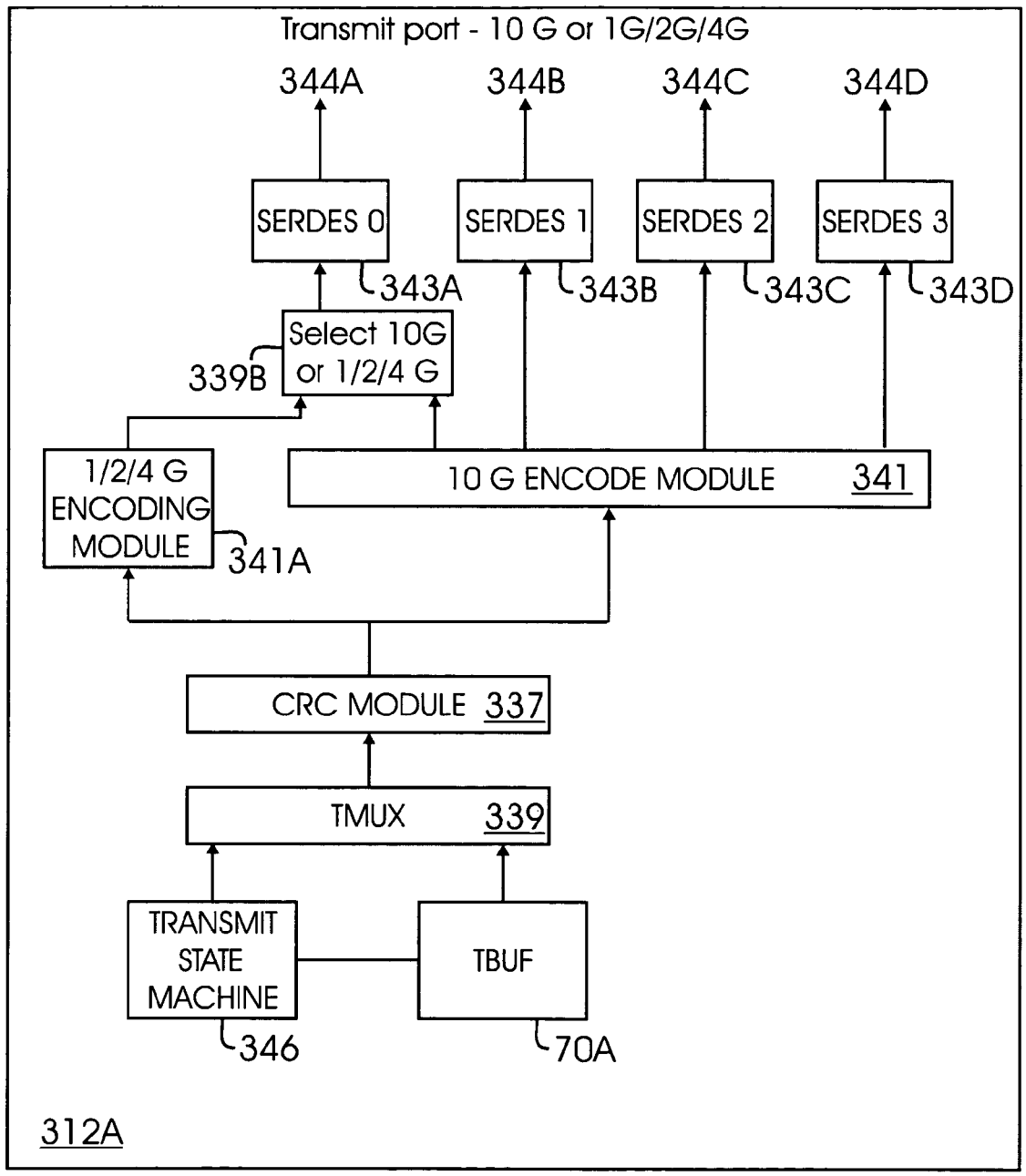
FIG. 6 shows a block diagram of a transmit port for a switch element that can be used at different rates, according to one aspect of the present invention.

Configuring 10 G Ports into Lower Speed (1 G/2 G/4 G/8 G) Ports:

FIGS. 5 and 6 show simplified block diagrams for RPORT 310A/TPORT 312A respectively, that can be implemented in the FIG. 4 fabric switch element allowing a 10 G port to be configured and operated as a 1 G/2 G/4 G/8 G ports or as a 10 G port. An ASIC element 20 can be used in different applications and for a variety of products. Some or all the processing elements can be shared by 10 G and 1 G/2 G/4 G/8 G modes, or separate receive and transmit pipes may be used to accommodate the different speeds.

As shown in FIG. 5, each of the four serial lanes (301A-301D) can be used for a 1 G/2 G/4 G/8 G port. For example, lane 301A may be used if the port is operating at 1 G/2 G/4 G/8 G rate and lanes 301A-301D may be used for a 10 G rate. It is noteworthy that the invention is not limited to how these lanes are distributed based on the desired port rate. If the transfer rate is lower then fewer SERDES are needed. For example, for 1 G/2 G/4 G/8 G, only SERDES 302A may be used, while for 10 G SERDES 302A-302D may be used.

Decode module 303F is used if the port is to be configured as a 1 G/2 G/4 G/8 G. Smoothing FIFO module 305F is also used to smooth the difference between the clock recovered by SERDES (302A-302D) from the received data stream and the clock used for the data path on the receiving switch port.

Deskew module 305E decode modules 303B-303E and smoothing modules 305A-305D are used when the port is being used as a 10 G port.

Mux 501 selects the port speed that can be set by IOP 66 or based on a control bit. Frame routing module 500 is the routing scheme of port 310A that has been discussed above with respect to FIGS. 3 and 4.

In FIG. 6, TPORT 312A can be configured as a 10 G or 1 G/2 G/4 G/8 G port. If the port operates at 10 G, then all lanes 344A-344D are used to transmit frames. At a lower rate, fewer lanes may be used, for example; only lane 344A may be used for 1 G/2 G/4 G/8 G rate.

Encoding module 341A is used for encoding frames at 1 G/2 G/4 G/8 G rates, while module 341 is used for 10 G speed. Module 339B is used to select a particular speed, i.e., 1 G/2 G/4 G/8 G or 10 G to transmit frames. Also, similar to RPORT 310A, fewer SERDES are used at lower rates, for example, if the port operates at 1 G/2 G/4 G/8 G, then only SERDES 343A may be used, and SERDES 343A-343D may be used at 10 G rate.

Figure 7A:
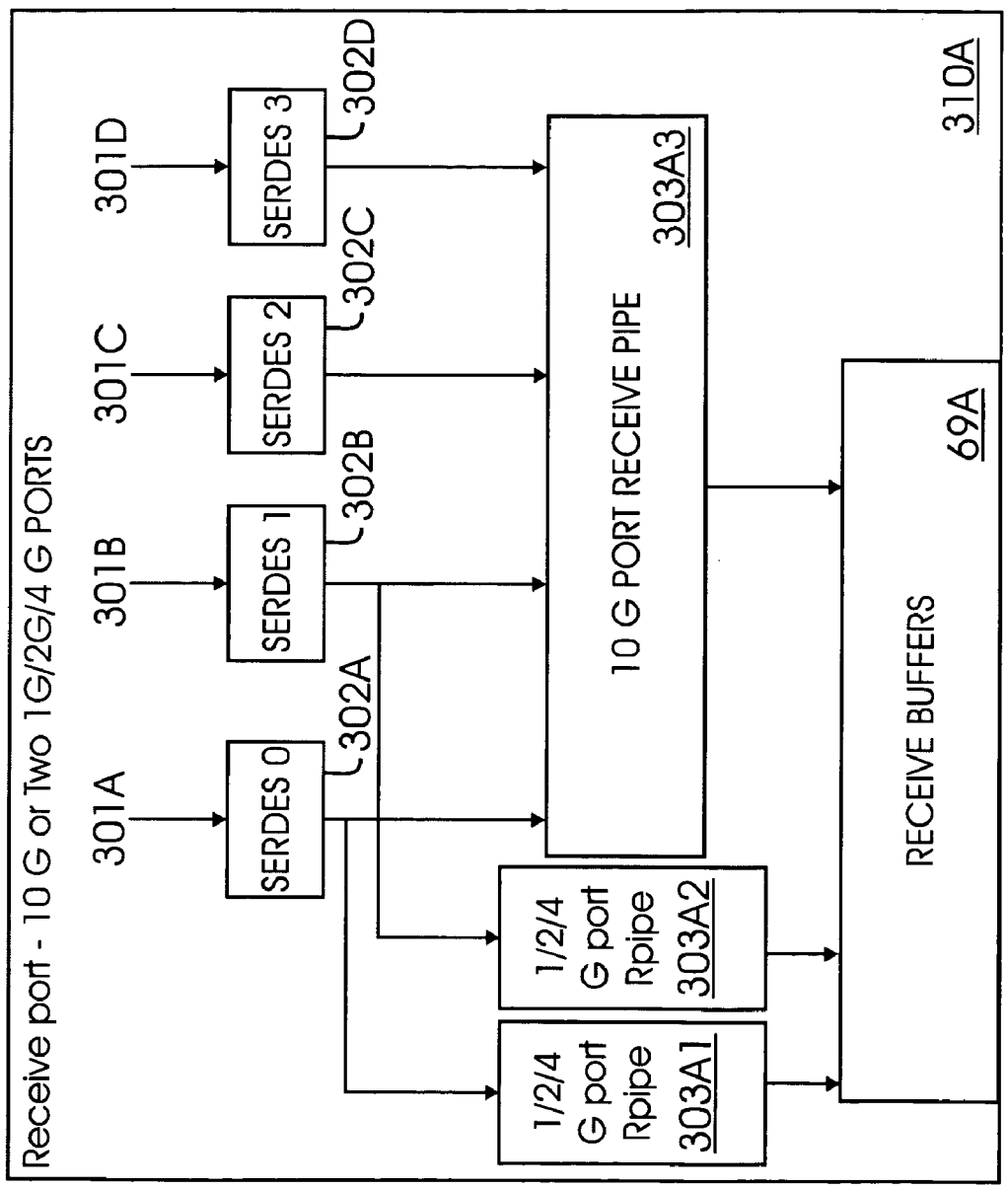
FIG. 7A shows a block diagram of a receive port for a switch element that can be used at different rates, according to another aspect of the present invention.

FIG. 7A shows a simplified block diagram for a receive port where a 10 G port can be configured into more than one 1 G/2 G/4 G/8 G ports. As shown in FIG. 7A, separate receive pipes are used for 1 G/2 G/4 G/8 G and 10 G. The receive pipes are shown as 303A1, 303A2 and 303A3. Receive pipes 303A1 and 303A2 are used for configuring port 310A as a 1 G/2 G/4 G/8 G port, while pipe 303A3 is used for 10 G speed. The 10 G receive pipe 303A3 has 4 SERDES 302A-302D, Deskew module 305E, smoothing FIFO 305A-305D. While receive pipe 303A1 and 303A2 has a SERDES 302, decode module 304, SMF 306, and CRC module 313A for receiving incoming frames, as described above with respect to FIGS. 3 and 4.

Figure 7B:
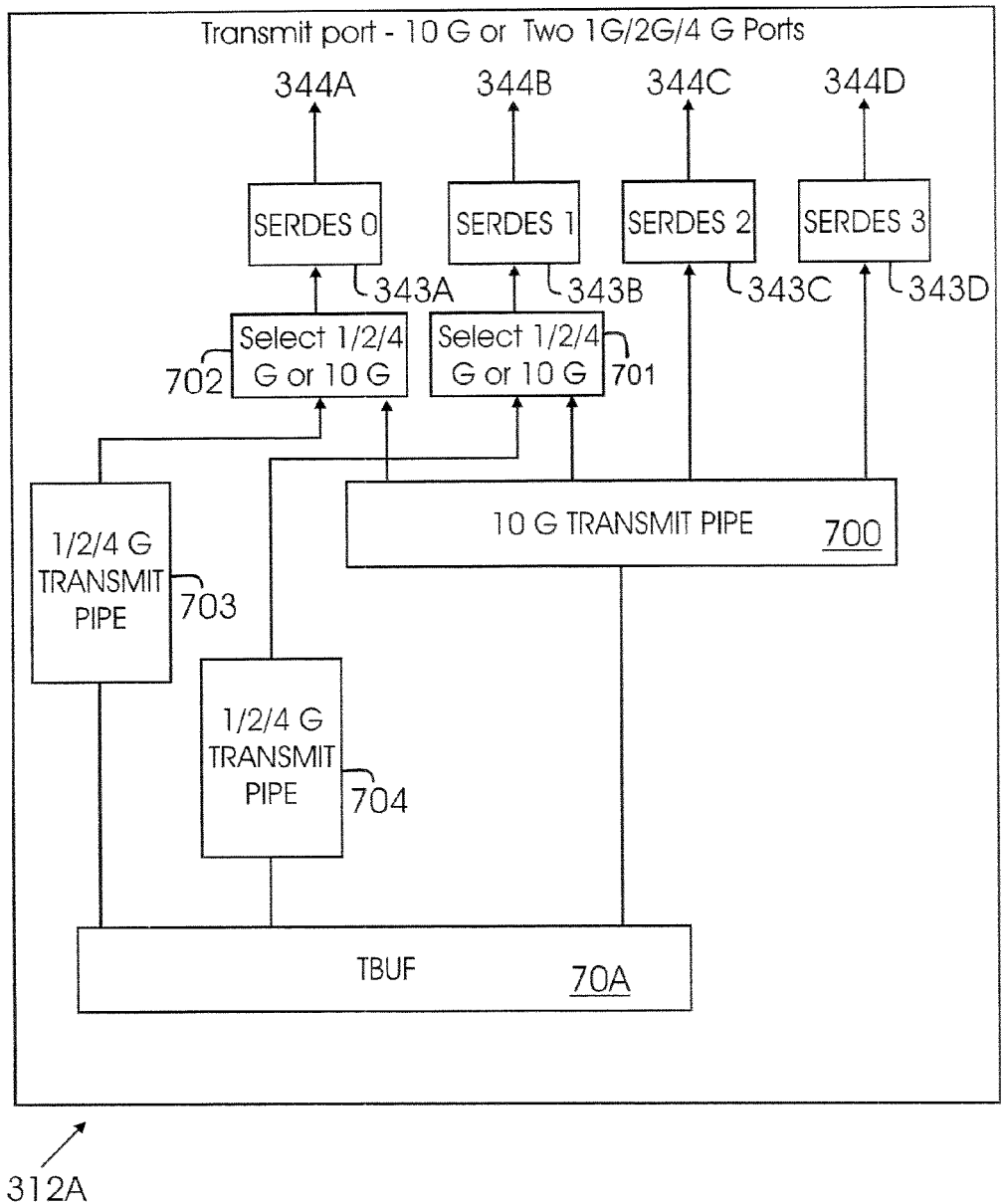
FIG. 7B shows a block diagram of a transmit port for a switch element that can be used at different rates, according to another aspect of the present invention.

FIG. 7B shows another embodiment of TPORT 312A, which includes transmit pipes 703 and 704 for 1 G/2 G/4 G/8 G configuration and transmit pipe 700 for a 10 G configuration (similar to FIG. 4B). Transmit pipe as used throughout this specification includes modules 340-342 (FIG. 4B). Logic 701 and 702 select a particular port speed.

Figure 8:
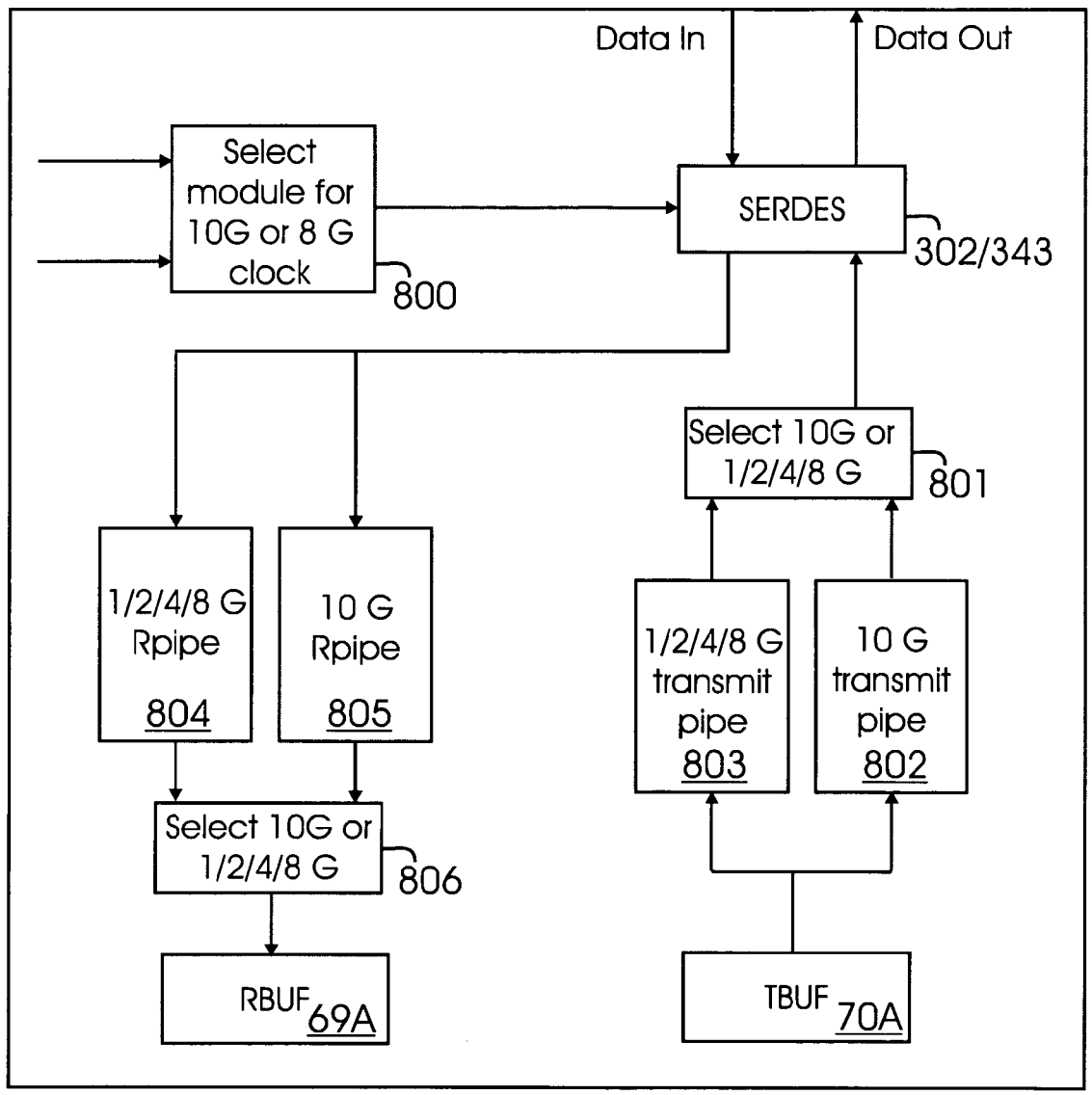
FIG. 8 shows another block diagram of receive and transmit segments for configuring a 10 G port into a 1 G/2 G/4 G/8 G port, according to one aspect of the present invention.

FIG. 8 shows yet another block diagram with receive and transmit segments (i.e. 310A and 312A) for configuring a 10 G port into a 1 G/2 G/4 G/8 G port. Logic 800 allows SERDES 343 to be selected to operate in the 1 G/2 G/4 G/8 G environment. Receive pipe 804 is used if the port is to operate at 1 G/2 G/4 G/8 G, while receive pipe 805 is used for a 10 G rate. For the transmit side, logic 801 selects the rate (i.e. 10 G or 1 G/2 G/4 G/8 G) and pipes 803 and 802 to transfer data at a particular data rate.

Clock Variation

Figures 1, 1E, 2:
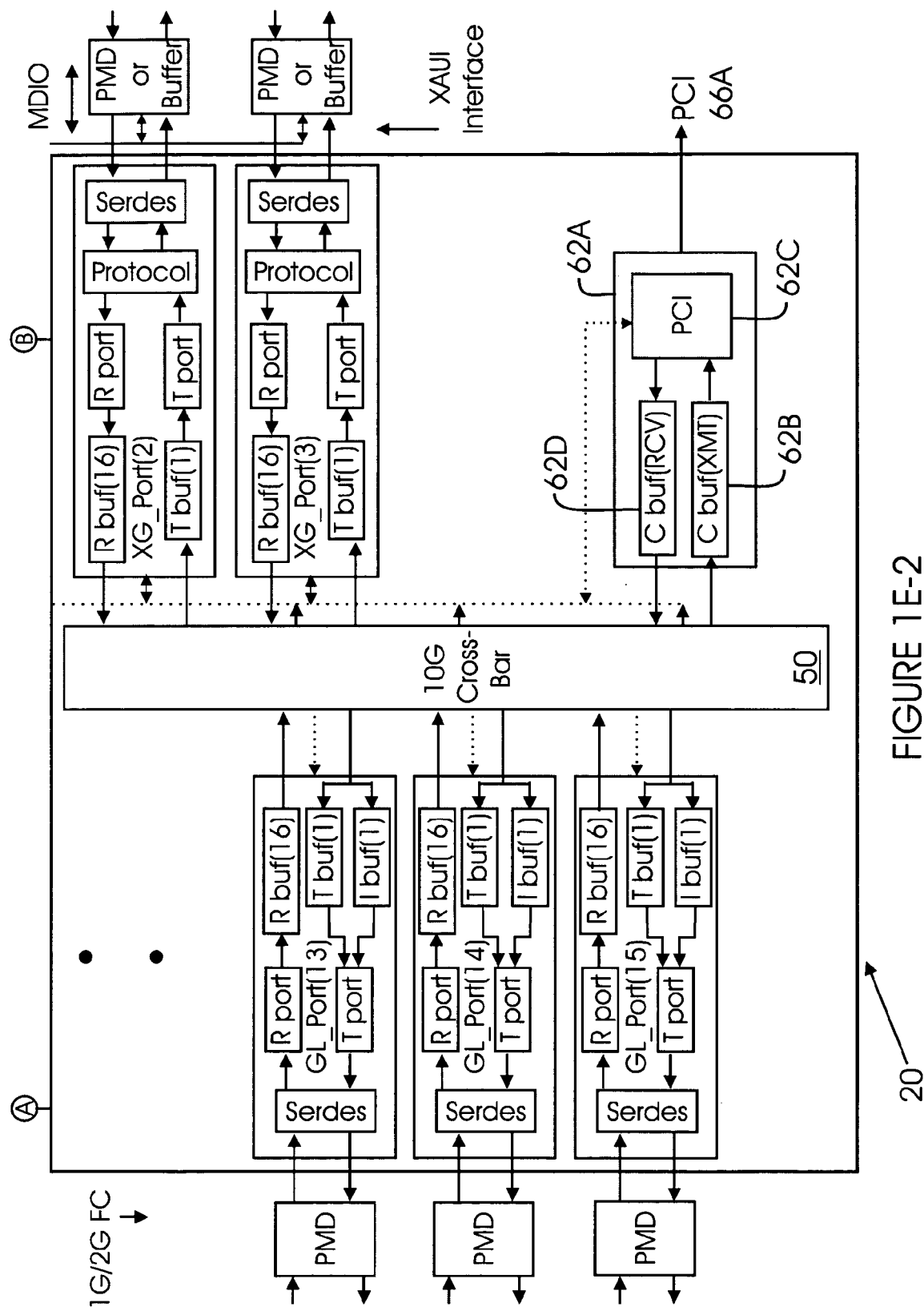
FIG. 2 is a block diagram of a switch element, according to one aspect of the present invention.
Figure 2:
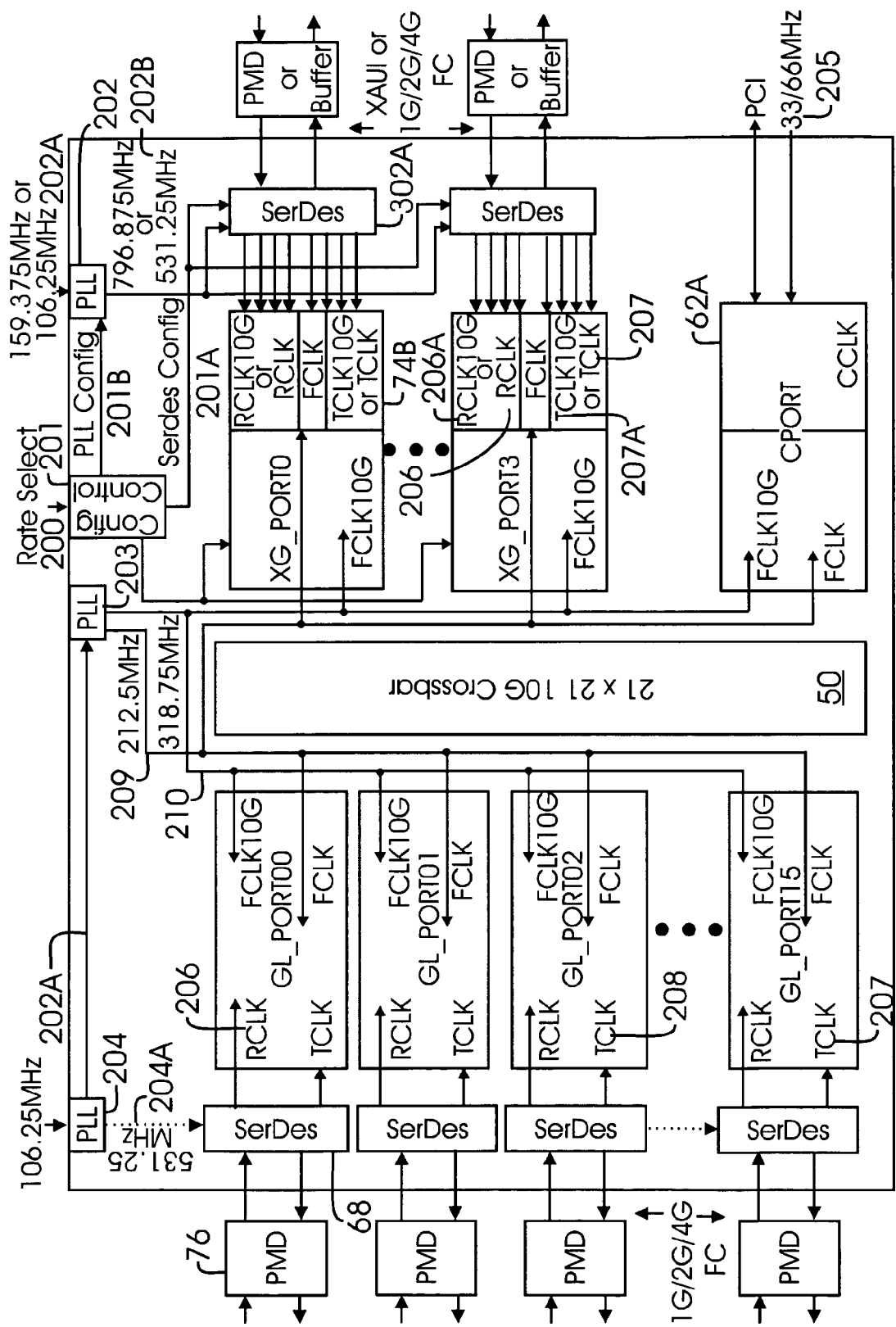

FIG. 2 shows a block diagram for ASIC 20 with various clock domains with the frequency sources. ASIC 20 includes clock configuration module 201 (referred to as module 201) that configures a port's rate based on signal 200, which may be generated by IOP 66. Module 201 adjusts PLL 202, for example, to either 766.875 MHz or 531.25 Mhz for generating the SERDES 302A input clock 202B. Module 201 also adjusts the control bits for each SERDES and XG_port as needed based on the selected line rate.

Module 201 also generates SERDES (for example, 302A) configuration signal 201A and phased locked loop ("PLL") 202 configuration signal 201B. An external oscillator (not shown) (which may operate at 106.25 MHz) feeds into PLL 204 that generates an output 204A for SERDES 68 (or 302, 302A-302D). Signal 202A is also sent to PLL 203 that generates FCLK 209 and FCLK10G 210.

For GL_Ports, receive pipe 303A receives the recovered byte clock and 10-bit data from SERDES 68 (or 302). The receive pipe 303A and SERDES 68 rate is determined by a bit that is set in the control register 326. For example, a bit "Rx-Rate" may be used with the following values: "00" for 1 G, "01" for 2 G, "10" for 4 G and "11" for 8 G.

In GL_Ports, the transmit pipe runs in the TCLK 207 (or TCLK 208) domain. The output from a transmit port is fed into SERDES 343 as 10-bit serial data. Transmit port rate is again determined by a control bit set in register 326. For example, a bit "Tx-Rate" may be used with the following values: "00" for 1 G, "01" for 2 G, "10" for 4 G, and "11" for 8 G.

For a 10 G port (XG_PORT), the receive pipe operates at RCLK 206 (at 1 G/2 G/4 G/8 G) or RCLK10G 206A (at 10 G). The transmit pipe area operates in the FCLK10G 207A clock domain. The output from a 10 G transmit pipe (for example, 802) is fed into SERDES 343. When an XG_PORT is configured as 1 G/2 G/4 G/8 G port, then the 1 G/2 G/4 G/8 G transmit pipe regions (for example, 803) operate at FCLK10G, as shown in FIG. 2 and the transmit port output is sent to SERDES 343 as 10-bit data (instead of 40-bit for 10 G (10bit per lane).

Crossbar 50 operates at 10 G in FCLK10G clock domain 210.

The following rules may be used to determine how different port rates are determined and handled:

Any GL_PORT and XG_PORT can run at 1 G, 2 G, 4 G or 8 G based on a control bit (XG_Config=1) that is set in control register 326. ASIC 20 also uses two clocks 209 (for example, at 212.5 MHz) and 210 (for example, at 318.75 MHz) to operate various components of ASIC 20. A 1 G source port sending data to a 1 G destination has a bandwidth of about 100 Megabytes ("MB")/S. A 2 G source port sending data to a 2 G destination has a maximum bandwidth of about 200 MB/S, while a 4 G source port sending data to a 4 G destination has a maximum bandwidth of about 400 MB/S. An 8 G-source port can have a maximum bandwidth of about 800 MB/s. A 10 G source port sending data to a 10 G destination has a bandwidth of 1200 MB/s.

Two 1 G source ports sending data to a single 2 G destination results in the destination having a bandwidth of 200 MB/S, four 1 G source ports sending data to a single 4 G destination results in a bandwidth of 400 MB/S, eight 1 G source ports sending data to a single 8 G destination results in a bandwidth of 800 MB/s. Twelve 1 G source ports sending data to a single 10 G destination results in a bandwidth of 1200 MB/s. Two 2 G source ports sending data to a single 4 G destination results in a maximum bandwidth of 400 MB/s.

Four 2 G or two 4 G ports sending data to an 8 G port results in a maximum bandwidth of 800 MB/s. Six 2 G or three 4 G sources sending data to a single 10 G destination results in a bandwidth of 1200 MB/s.

GL_Port Rate Control by Area:

RPORT 310/310A:

Between SERDES 302 and the write side of SMF 306, all components operate at the recovered clock 202A (for example, 106.25 MHz for 1 G, 212.5 MHz for 2 G, 425 MHz for 4 G and 850 MHz for 8 G. It is noteworthy that the data width may be doubled to reduce the recovered clock frequency in half.). Between the read side of SMF 306 and the write side of RBUF 69A, all modules operate at the rate specified by the Tx_Rate bit, described above. P To avoid underflow, RBUF 69A reads and transfers data when the rate for the read address is less then the rate for the write address.

TPORT 312A:

Between read side of TBUF 70A and SERDES 343, all components operate at the rate specified by Tx_Rate bit.

Cut-Through Routing: To avoid underflow/overflow conditions, depending upon the transfer rate, RBUF 69A sends a "cut-through" signal to TBUF 70A, so that an underflow condition does not occur in TBUF 70A. For example, when a source port is operating at 1 G and the destination port is operating at 2 G, RBUF waits at least for ½ of a maximum length frame after the write operation begins or for the EOF to prevent underflow on the read side of TBUF 70A.

When the source port operates at 1 G and the destination port operates at 4 G, RBUF 69A read operation waits ¾ of a maximum length frame after the write operations begins to minimize underflow.

When the source port operates at 1 G and the destination port operates at 8 G, RBUF 69A read operation waits ⅞ of a maximum length frame after the write operations begins to minimize underflow.

When the source port operates at 1 G and the destination port operates at 10 G, then RBUF 69A read operation waits $^{11}\!/_{12}$ maximum length frame after the write operation begins to avoid under flow of TBUF 70A.

When a source port operates at 2 G and the destination port operates at 4 G, then RBUF 69A read operation waits for at least ½ maximum length frame after the write operation to minimize under-flow.

When a source port operates at 2 G and the destination port operates at 4 G, RBUF 69A read operation waits until $^{5}\!/_{6}{}^{th}$ maximum length frame. If a source port operates at 10 G and the destination port operates at 10 G, then RBUF 69A waits for $^{3}\!/_{4}{}^{th}$ maximum length frame to avoid under flow.

Table I (FIG. 9) provides the amount of frame that must be received before the cut status can be set.

XG_Port Rate Control by Area:

All areas of a 10 G XG_port operate at the maximum rate and are clocked at 318.75 MHz when the port is configured to operate at 10 G. If the port is configured to operate at a lower speed, then between SERDES 302A-302D and the write side of SMF 305A-305D, all components operate at the recovered clock 202A (for example, 106.25 MHz for 1 G, 212.5 MHz for 2 G, 425 MHz for 4 G, and 850 MHz for 8 G). Between the read side of SMF 305A-305D and the write side of RBUF 69A, all modules operate at the rate specified by the Tx_Rate bit, described above.

Between read side of TBUF 70A and SERDES 343, all components operate at the rate specified by Tx_Rate bit.

In one aspect of the present invention, a 10 G port can be configured to operate at a lower speed, which can improve the overall utilization of a fabric switch element.

Although the present invention has been described with reference to specific embodiments, these embodiments are illustrative only and not limiting. Many other applications and embodiments of the present invention will be apparent in light of this disclosure and the following claims.

What is claimed is:

1. A fibre channel switch element for routing fibre channel frames, comprising:
a fibre channel port that is configured to operate at one or more of a plurality of data transfer rates, wherein a clock rate for one data transfer rate is not an integer multiple of a clock rate for another data transfer rate at which the same fibre channel port is configured to operate; wherein the same fibre channel port uses one interface to support one or more lanes for receiving and transferring frames at the plurality of data transfer rates; and the one interface includes a plurality of selectable serial/de-serializer (SERDES), where a higher number of SERDES and a higher number of lanes are selected for a first data transfer rate, and a lower number of SERDES and a lower number of lanes are selected for supporting a second data transfer rate, where the first data transfer rate is higher than the second data transfer rate.

2. The switch element of claim 1, wherein the one data transfer rate is 1 G (gigabit per second).

3. The switch element of claim 1, wherein the one data transfer rate is 2 G (gigabit per second).

4. The switch element of claim 1, wherein the one data transfer rate is 4 G (gigabit per second).

5. The switch element of claim 1, wherein the one data transfer rate is 8 G (gigabit per second).

6. The switch element of claim 1, wherein the one data transfer rate is 10 G (gigabit per second).

7. The switch element of claim 1, wherein the switch element includes a clock configuration module for providing a clock signal that is based on a configured data transfer rate for the same fibre channel port.

8. The switch element of claim 1, wherein when a source port is operating at a lower data transfer rate than a destination port, a receive segment of the fibre channel port sends a signal to a transmit segment to avoid an under flow condition.

9. The switch element of claim 8, wherein the receive segment waits for a certain frame length after a fibre channel frame is written and before the fibre channel frame is read for transmission, where the certain frame length depends upon a data transfer rate of the source port and the destination port.

10. The switch element of claim 1, wherein multiple lanes are configured for the fibre channel port to operate as a single 10 G multi lane port and the same fibre channel port uses the multiple lanes for the same fibre channel port to operate as a different port at a rate lower than 10 G.

11. The switch element of claim 1, wherein same transmit and receive pipelines are used by the same fibre channel port configured to operate at different speeds.

12. The switch element of claim 1, wherein transmit and receive pipelines are selected from a plurality of receive pipelines and transmit pipelines, depending upon a data transfer rate at which the fibre channel port is configured to operate.

13. The switch element of claim 1, wherein a receive buffer for the fibre channel port is shared by multiple lanes, when the fibre channel port is configured to operate at different rates.

14. The switch element of claim 1, wherein a separate receive buffer is used for each of the plurality of lanes when the same fibre channel port is configured to operate at different rates.

15. The switch element of claim 1, wherein each of the plurality of lanes is configured to operate at a different rate depending on the configuration of the fibre channel port.

16. The switch element of claim 1, wherein the fibre channel port auto-negotiates with other ports, the rate at which the configurable fibre channel port is operating.

17. A switch element for routing network frames, comprising:
a port that is configured to operate at one or more of a plurality of data transfer rates;
wherein a clock rate for one data transfer rate is not an even multiple of a clock rate for another data transfer rate at which the port is configured to operate;
wherein the port uses one interface to support one or more lanes for receiving and transferring frames at the plurality of data transfer rates; and the one interface includes a plurality of selectable serial/de-serializer (SERDES); and wherein a higher number of SERDES and a higher number of lanes are selected for a first data transfer rate, and a lower number of SERDES and a lower number of lanes are selected for supporting a second data transfer rate, where the first data transfer rate is higher than the second data transfer rate; and wherein the switch element includes a clock configuration module for providing a clock signal that is based on a configured data transfer rate for the port.

18. The switch element of claim 17, wherein each of the plurality of lanes is configured to operate at a different rate depending on the configuration of the port.

19. The switch element of claim 17, wherein the data transfer rate is one or more of 1 G (gigabit per second); 2 G, 4 G, 8 G, 10 G or higher than 10 G.

20. The switch element of claim 17, wherein the port auto-negotiates with other ports, the rate at which the configurable port is operating.

* * * * *

UNITED STATES PATENT AND TRADEMARK OFFICE
CERTIFICATE OF CORRECTION

PATENT NO. : 7,558,281 B2  Page 1 of 1
APPLICATION NO. : 10/894917
DATED : July 7, 2009
INVENTOR(S) : Frank R. Dropps et al.

It is certified that error appears in the above-identified patent and that said Letters Patent is hereby corrected as shown below:

On page 5, in column 1, under "Other Publications", line 55, delete "December 28, 2006" and insert -- Dec. 5, 2006 --, therefor.

In column 4, line 30, delete "Definitions" and insert -- Definitions: --, on Col. 4, Line 31, as a sub-heading to the paragraph.

In column 5, line 27, delete "Circuit"" and insert -- Circuit") --, therefor.

In column 6, line 23, delete "GL ports" and insert -- GL_ports --, therefor.

In column 6, line 24-25, delete "GL port" and insert -- GL_port --, therefor.

In column 6, line 28, delete "GL port." and insert -- GL_port. --, therefor.

In column 6, line 28, After "GL port." insert -- The SERDES converts parallel data into a serial data stream for transmission and converts received serial data into parallel data. The 8 bit to 10 bit encoding enables the SERDES to generate a clock signal from the received data stream. --.

In column 6, line 29, delete "GL port has" and insert -- GL_port may have --, therefor.

In column 6, line 34, delete "C0-C19, It" and insert -- C0-C19. It --, therefor.

In column 6, line 66, After "of" insert -- a --.

In column 12, line 62-64, delete "P To avoid underflow, RBUF 69A reads and transfers data when the rate for the read address is less then the rate for the write address." and insert -- To avoid underflow, RBUF 69A reads and transfers data when the rate for the read address is less then the rate for the write address. --, on Line 63 (Approx.), as a new paragraph, below "above.".

Signed and Sealed this

Twenty-sixth Day of October, 2010

David J. Kappos
*Director of the United States Patent and Trademark Office*